United States Patent
Niu et al.

(10) Patent No.: US 10,552,256 B2
(45) Date of Patent: Feb. 4, 2020

(54) MORPHABLE ECC ENCODER/DECODER FOR NVDIMM OVER DDR CHANNEL

(71) Applicant: Samsung Electronics Co., Ltd., Suwon-si, Gyeonggi-do (KR)

(72) Inventors: Dimin Niu, Sunnyvale, CA (US); Mu-Tien Chang, San Jose, CA (US); Hongzhong Zheng, Los Gatos, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 15/675,679

(22) Filed: Aug. 11, 2017

(65) Prior Publication Data
US 2018/0322007 A1  Nov. 8, 2018

Related U.S. Application Data

(60) Provisional application No. 62/503,317, filed on May 8, 2017.

(51) Int. Cl.
*G06F 11/10* (2006.01)
*G06F 11/00* (2006.01)
*G06F 13/00* (2006.01)
*G06F 13/42* (2006.01)

(52) U.S. Cl.
CPC ...... *G06F 11/1044* (2013.01); *G06F 13/4239* (2013.01)

(58) Field of Classification Search
None
See application file for complete search history.

(56) References Cited

U.S. PATENT DOCUMENTS

| | | | | |
|---|---|---|---|---|
| 8,429,498 B1* | 4/2013 | Anholt | | G06F 11/1048 |
| | | | | 365/227 |
| 8,892,980 B2 | 11/2014 | Fillingim | | |
| 9,183,085 B1* | 11/2015 | Northcott | | G06F 11/1068 |
| 9,201,728 B2* | 12/2015 | Patapoutian | | G06F 11/1012 |
| 9,294,132 B1* | 3/2016 | Peleato-Inarrea | | |
| | | | | H03M 13/2948 |
| 9,344,117 B2* | 5/2016 | Mula | | H03M 13/1515 |
| 9,407,294 B2 | 8/2016 | Hanham et al. | | |
| 9,621,188 B2* | 4/2017 | Hof | | H03M 13/3707 |
| 9,692,455 B2* | 6/2017 | He | | H03M 13/616 |
| 2008/0244356 A1* | 10/2008 | Bliss | | H03M 13/2906 |
| | | | | 714/755 |
| 2014/0040550 A1 | 2/2014 | Nale et al. | | |
| 2014/0105202 A1* | 4/2014 | Hansen | | H03M 13/27 |
| | | | | 370/338 |
| 2015/0363262 A1 | 12/2015 | Hu et al. | | |
| 2016/0284424 A1 | 9/2016 | Das et al. | | |
| 2017/0077955 A1* | 3/2017 | He | | H03M 13/616 |
| 2017/0288705 A1* | 10/2017 | Li | | H03M 13/2927 |

* cited by examiner

*Primary Examiner* — Justin R Knapp
(74) *Attorney, Agent, or Firm* — Renaissance IP Law Group LLP

(57) ABSTRACT

A hardware coding mechanism is described. The coding mechanism may include a first encoder to produce a first code using a base number of bits and a second encoder to produce a second code using a supplementary number of bits. The second code and the first code together may be stronger than the first code alone. A mode register stored in a storage may specify whether a switch to the second encoder is open or closed: the first coder is always used.

22 Claims, 15 Drawing Sheets

MORPHABLE ECC ENCODER/DECODER FOR NVDIMM OVER DDR CHANNEL

RELATED APPLICATION DATA

This application claims the benefit of U.S. Provisional Patent Application Ser. No. 62/503,317, filed May 8, 2017, which is incorporated by reference herein for all purposes.

FIELD

The inventive concepts relate generally to memory modules, and more particularly to supporting varying levels of encoding/decoding in memory transactions.

BACKGROUND

Non-Volatile Dual In-Line Memory Modules (NVDIMMs) using Dual Data Rate (DDR) channels require asynchronous handshakes via a transaction-based interface. This handshake, which may also be used by other forms of memory other than NVDIMMs, may have variable read/write timing, and feedback information from the DIMM is required. In addition, some systems want to exchange metadata (request ID, hit/miss information, vendor metadata, etc.) between the host and DIMM. A dedicated channel to deliver metadata would require a hardware change, but using a dedicated package to deliver metadata would increase the performance overhead.

It is possible to exchange metadata using bits allocated for Error Correcting Codes (ECCs). U.S. Patent Publication No. 2014/0040550 to Nale et al. and assigned to Intel Corp. describes one approach to use ECC bits for metadata. In this solution, there is a "near/far" asynchronous memory hierarchy that requires metadata information transfers, and a protocol provides for the metadata exchange. But this protocol does not allow vendors to implement metadata for vendor-specific functions.

In addition, using ECC bits to facilitate the exchange of metadata means that those bits are not available for ECC. Thus, allocating ECC bits for use as metadata leads to a weaker ECC system. Compounding the problem is that different systems may require differing numbers of bits for metadata, which in turn affects how many bits are available for error correction.

A need remains for a way to manage the use of ECC bits for both ECC and metadata.

DETAILED DESCRIPTION

Figure 1:
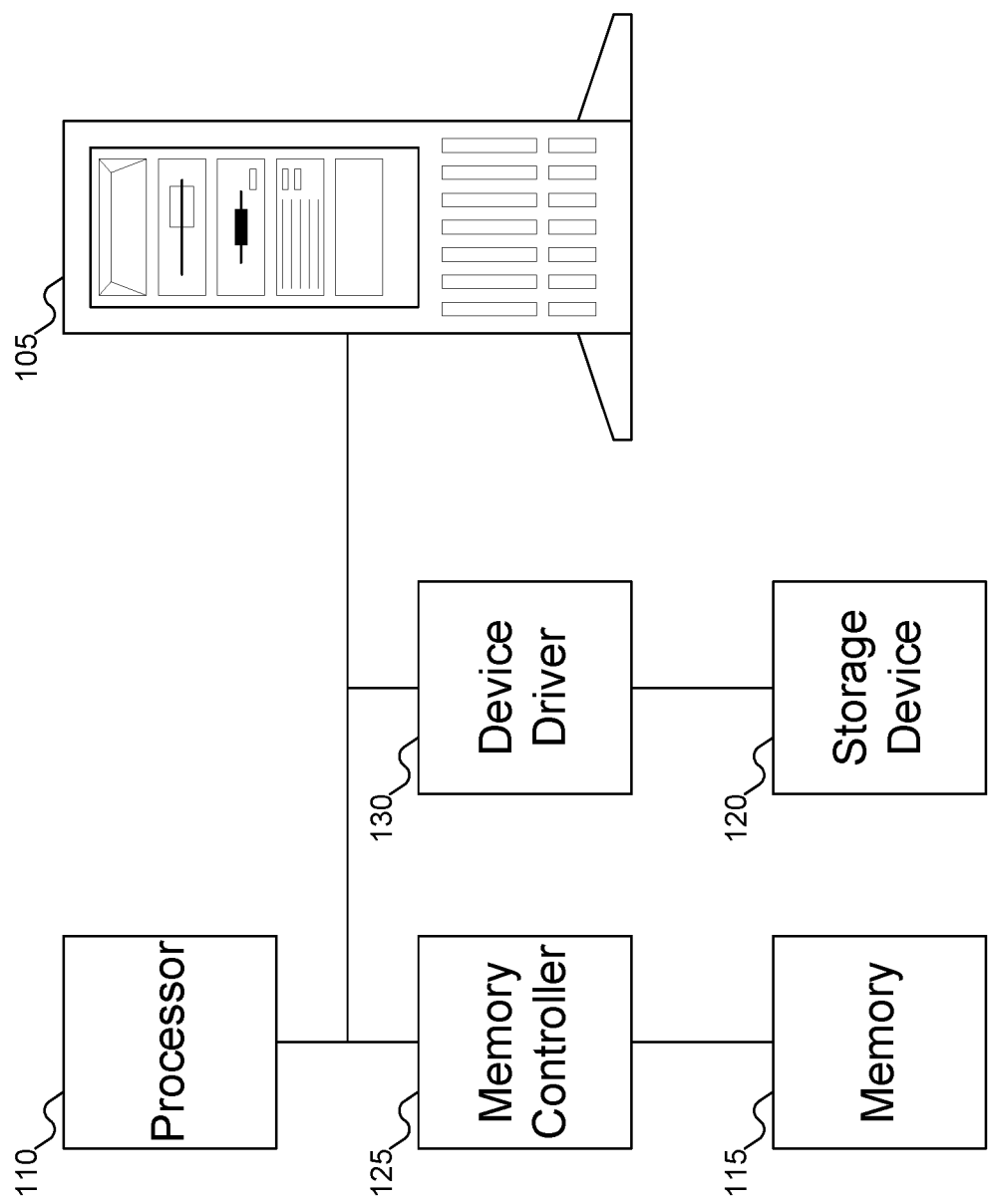
FIG. 1 shows a machine operative to perform multiple levels of encoding/decoding, according to an embodiment of the inventive concept.

Reference will now be made in detail to embodiments of the inventive concept, examples of which are illustrated in the accompanying drawings. In the following detailed description, numerous specific details are set forth to enable a thorough understanding of the inventive concept. It should be understood, however, that persons having ordinary skill in the art may practice the inventive concept without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first module could be termed a second module, and, similarly, a second module could be termed a first module, without departing from the scope of the inventive concept.

The terminology used in the description of the inventive concept herein is for the purpose of describing particular embodiments only and is not intended to be limiting of the inventive concept. As used in the description of the inventive concept and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Conventional Dynamic Random Access Memory (DRAM) uses a synchronous protocol to manage memory transactions between Dual In-Line Memory Modules (DIMMs) and memory controllers. A synchronous interface has some advantages: both the DIMM and the memory controller know exactly when to expect data to be available. Non-Volatile Dual In-Line Memory Modules (NVDIMMs), on the other hand, use an asynchronous protocol (NVDIMM-P). With an asynchronous protocol, the amount of time required to complete a memory transaction may vary based on any number of factors, such as the operation being performed and the material used in manufacturing the NVDIMM. In addition, the asynchronous protocol may require handshaking, which requires feedback from the NVDIMM to the memory controller. This feedback may take the form of metadata attached to the data being transmitted from the NVDIMM to the memory controller.

In addition, the host may specify metadata that is to be stored with the data. This metadata is often attached to the data using some "spare" bits in the memory transaction, such as Error Correcting Code (ECC) bits. When the data is read from memory, this metadata should be read and returned to the memory controller as well. Different vendors may require different metadata bit allocations, and the various conventional ways of supporting these varying metadata requirements each have their own drawbacks. Essentially, supporting metadata bits requires trading off the availability of bits for ECC—and hence ECC strength.

For example, consider a memory module that includes 8 bits for ECC in each of 8 bursts of data. This combination translates to a total of 64 bits usable for ECC for each 512-bit memory transaction.

If three of those eight bits per burst are used for metadata, then 24 of the 64 ECC bits are used for metadata, leaving 40 bits available for ECC. But if only two of those eight bits per burst are used for metadata, then only 16 of the 64 ECC bits are used for metadata, leaving 48 bits available for ECC. The former combination offers more bits for metadata, but weaker ECC. The latter combination offers stronger ECC, but with fewer bits for metadata.

If memory modules are manufactured with a specific number of bits allocated for metadata and ECC, then different memory modules are needed to support different metadata and ECC requirements. A better solution would support multiple different ECC algorithms (some stronger, some weaker) in a single device, to allow for flexibility in the amount of associated metadata in the remaining bits.

Future memory solutions, such as Double Data Rate (DDR) 5, introduce other complications. With the change to narrow channels in DDR5 memory, the number of bits to be pre-fetched increases, along with the overhead for error correction. For example, DDR4 memory requires two ECC chips per 16 data chips; DDR5 memory, on the other hand, requires two ECC chips per eight data chips. Thus, to maintain the existing ECC capability in DDR5 requires increased ECC overhead; maintain the existing overhead weakens the ECC capability of the memory.

A conventional multi-ECC coding system, requires two (or more) full encoders or decoders, but only one (the coding system for the active ECC mechanism) is active at a time, requiring far more circuitry. In embodiments of the inventive concept, the encoder/decoder may be divided into an "always on" part and a switchable part that provides for greater coverage.

As an example of how embodiments of the inventive concept may work, the "always on" part of the encoder/decoder may implement a Cyclic Redundancy Check (CRC), which may enable detection of errors (but not necessarily error correction). The switchable encoder/decoder may implement parity information, which may enable error correction as well.

The operation of the switchable encoder/decoder circuits may be altered by setting a particular value in a mode register.

The designs herein may be applied to both NVDIMMs and future DDRx interface-based DRAM.

FIG. 1 shows a machine with a storage device, according to an embodiment of the inventive concept. In FIG. 1, machine 105 is shown. Machine 105 may be any desired machine, including without limitation a desktop or laptop computer, a server (either a standalone server or a rack server), or any other device that may benefit from embodiments of the inventive concept. Machine 105 may also include specialized portable computing devices, tablet computers, smartphones, and other computing devices. Machine 105 may run any desired applications: database applications are a good example, but embodiments of the inventive concept may extend to any desired application.

Machine 105, regardless of its specific form, may include processor 110, memory 115, and storage device 120. Processor 110 may be any variety of processor: for example, an Intel Xeon, Celeron, Itanium, or Atom processor, an AMD Opteron processor, an ARM processor, etc. While FIG. 1 shows a single processor, machine 105 may include any number of processors, each of which may be single core or multi-core processors. Memory 115 may be any variety of memory, such as flash memory, Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types. Memory 115 may be controlled by memory controller 125, also part of machine 105.

Storage device 120 may be any variety of storage device. Storage device 120 may be controlled by device driver 130, which may reside within memory 115.

Figure 2:
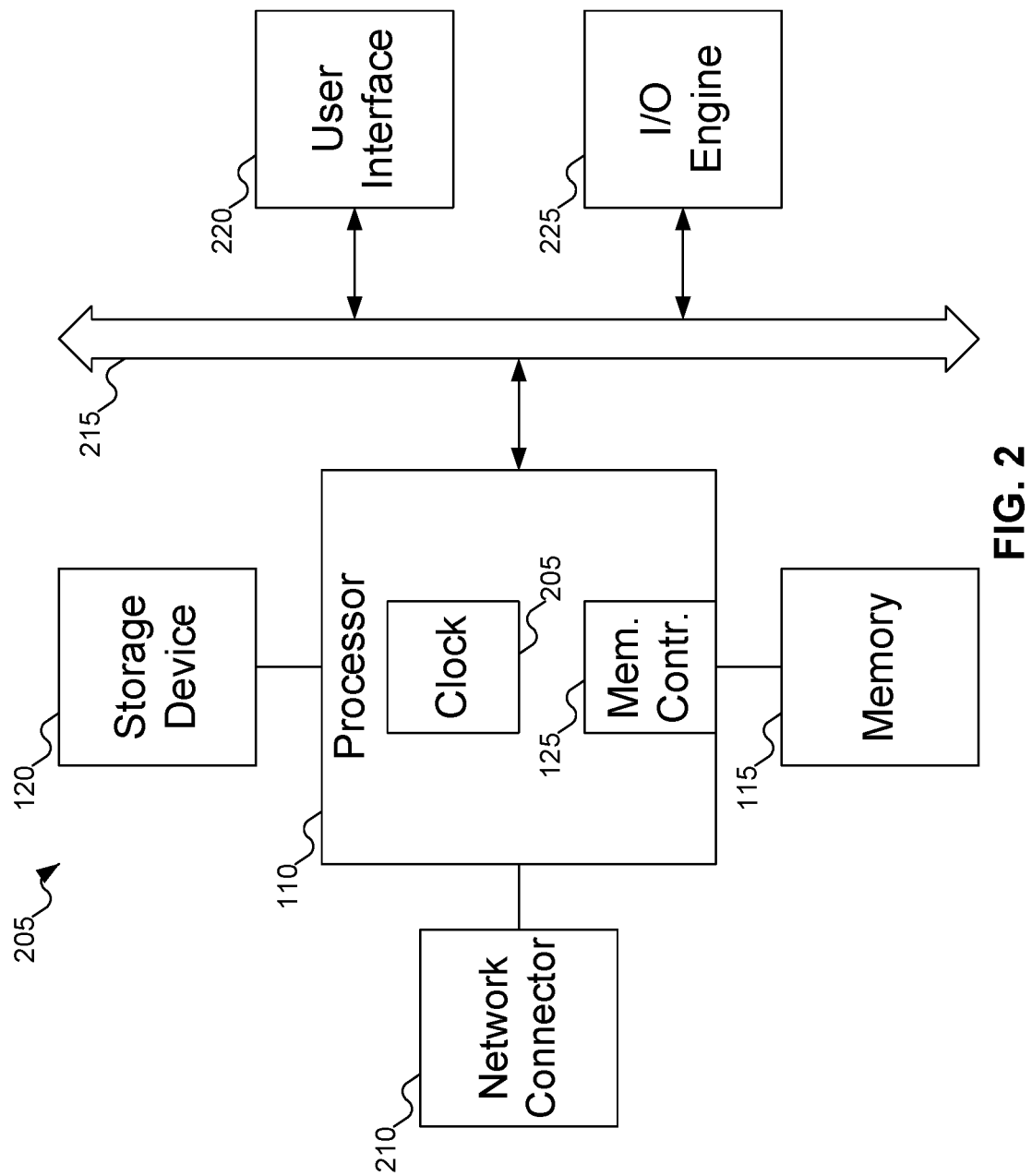
FIG. 2 shows additional details of the machine of FIG. 1.

FIG. 2 shows additional details of machine 105 of FIG. 1. Referring to FIG. 2, typically, machine 105 includes one or more processors 110, which may include memory controller 125 and clock 205, which may be used to coordinate the operations of the components of machine 105. Processors 110 may also be coupled to memory 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to a bus 215, to which may be attached user interface 220 and Input/Output interface ports that may be managed using Input/Output engine 225, among other components.

Figure 3:
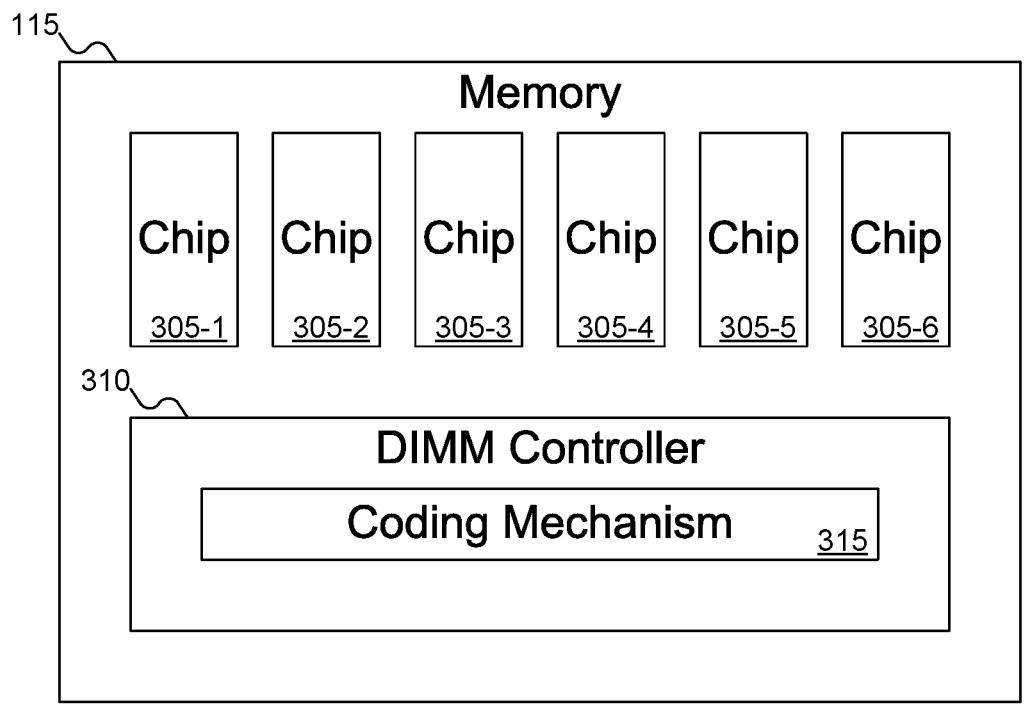
FIG. 3 shows a memory module in the machine of FIG. 1 operative to perform encoding/decoding.

FIG. 3 shows a memory module in machine 105 of FIG. 1 operative to perform encoding/decoding. In FIG. 3, memory module 115 is shown. Memory module 115 may include chips 305-1 through 305-6. FIG. 3 shows memory module 115 as including six chips 305-1 through 305-6, but embodiments of the inventive concept may support the use of any number of chips 305.

Memory module 115 may also include DIMM controller 310. DIMM controller 310 may control data movement between chips 305-1 through 305-6, a cache mechanism supporting a cache (not shown in FIG. 3) within memory module 115, and other functions. Coding mechanism 315, which may be part of DIMM controller 310, may perform and/or use various codings, such as Error Correction Codes (ECCs), as part of a memory transaction. For example, coding mechanism 315 may generate or use error correcting codes on data that is part of a memory transaction. As will be described below with reference to FIGS. 7-9, coding mechanism 315 may support multiple codings, which may share hardware implementations (either partially or fully) to reduce the space required within memory module 115 and the heat generated by memory module 115. The various codings also may be interrelated: that is, one coding may supplement another coding rather than being entirely distinct.

Figure 4:
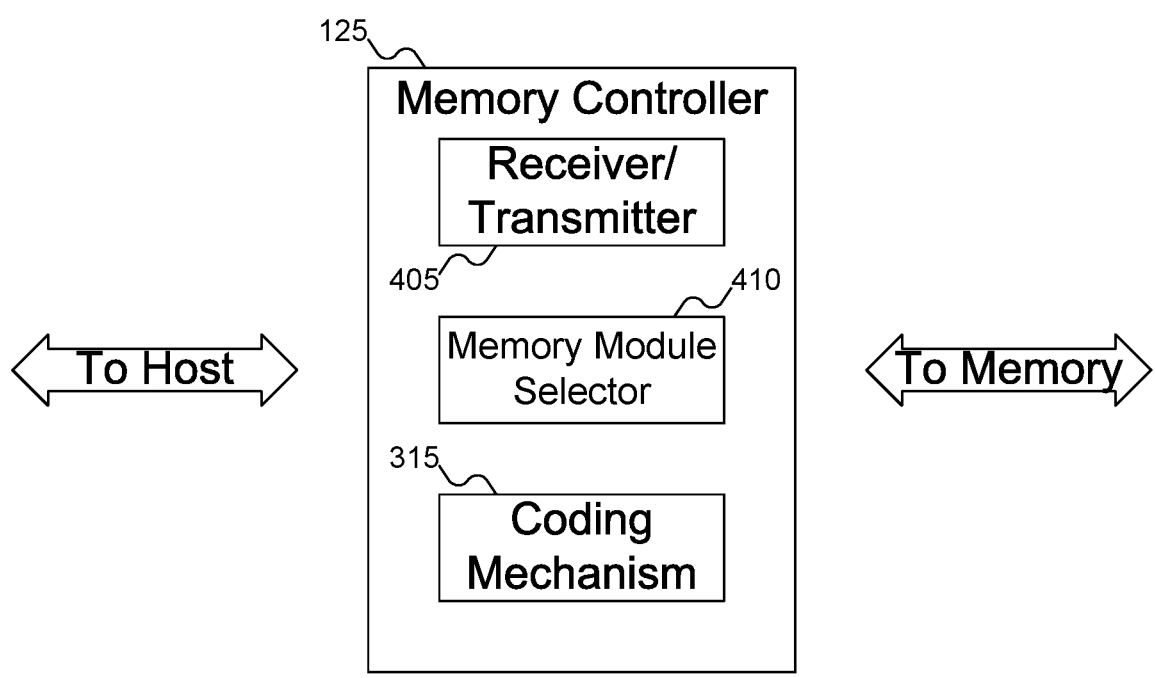
FIG. 4 shows the memory controller of FIG. 1 operative to perform encoding/decoding.

FIG. 4 shows memory controller 125 of FIG. 1 operative to perform encoding/decoding. In FIG. 4, memory controller 125 may include coding mechanism 315. Memory controller 125 may also include other conventional components, such as receiver/transmitter 405 to receive and transmit data between machine 105 of FIG. 1, memory module selector 410 to select a particular memory module to receive a memory transaction from machine 105 of FIG. 1, and so on. Coding mechanism 315 in memory controller 125 operates similarly to coding mechanism 315 in memory module 115 of FIG. 3, although typically one of memory module 115 of FIG. 3 and memory controller 125 will encode data and the other will decode data. For example, when coding mechanism 315 is used to generate error detection and correction codes, one coding mechanism 315 will generate the error detection and correction codes, and the other coding mechanism 315 will use those codes to determine whether any data transmitted as part of the memory transaction is in error.

Figure 5A:
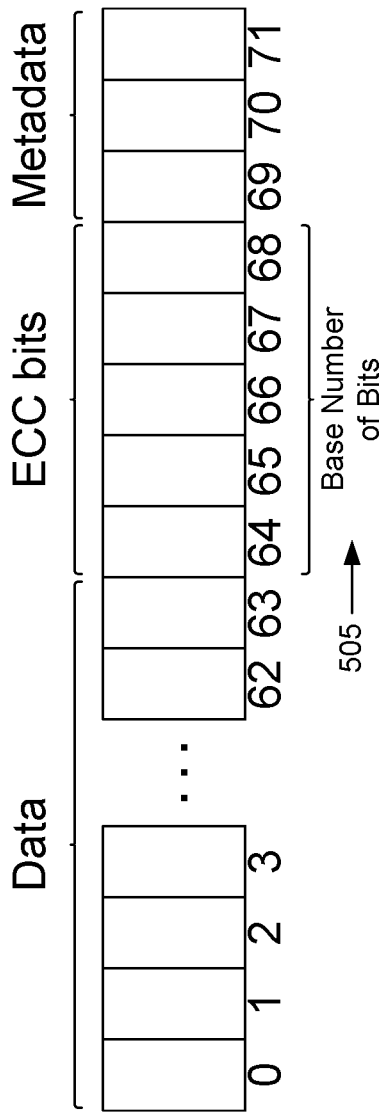
FIGS. 5A-5B show variable numbers of Error Correcting Code (ECC) bits used for encoding/decoding in a 64+8-bit wide memory channel.
Figure 5B:
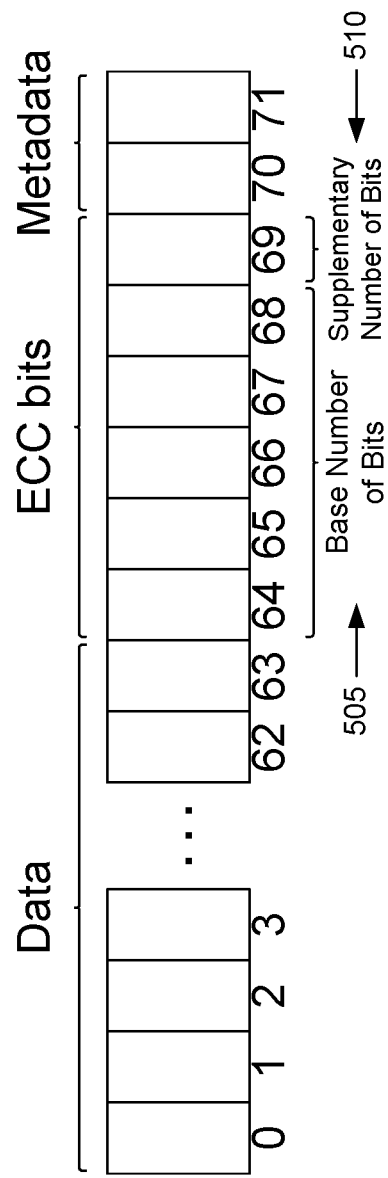

FIGS. 5A-5B show variable numbers of ECC bits used for encoding/decoding. In FIG. 5A, a wide memory channel is shown. In FIG. 5A (and in FIG. 5B), each burst in the memory transaction transmits 72 bits: 64 bits of data and eight bits of non-data. A total of eight bursts will deliver a total of 512 bits of data per memory transaction, and 64 bits of non-data per memory transaction.

Within each burst, of the eight bits allocated for non-data, five bits are shown being used for error detection/correction, and three bits are shown being used for metadata. The five bits used for error detection/correction may be considered for this example a "base number" of bits 505 that are always used for error detection/correction; the three remaining non-data bits may be used for error detection/correction or for metadata, depending on the specific implementation.

In contrast with FIG. 5A, in FIG. 5B the same 72 bits are shown. But in FIG. 5B, while base number of bits 505 remains the same (five bits), the other non-data bits are not allocated entirely for metadata. Instead, two of these bits are allocated for metadata, and the other (one) remaining bit is allocated for error detection/correction. This additional bit allocated for error detection/correction may be referred to in this example as "supplementary number" of bits 510. Because six of the eight ECC bits are actually used for error correction in FIG. 5B, FIG. 5B offers superior error detection/correction when compared with FIG. 5A. The number of bits used for data, non-data, ECC, and metadata are illustrative only: any number of bits could be used for any of the categories.

Figure 6A:
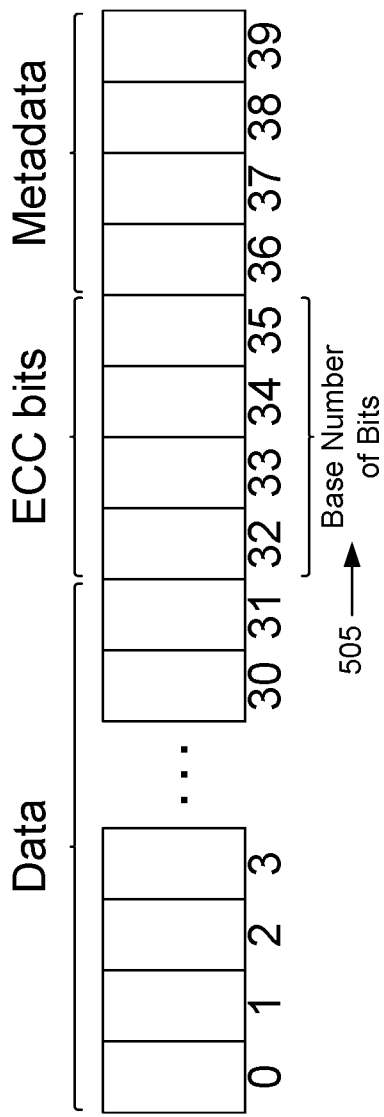
FIGS. 6A-6B show variable numbers of ECC bits used for encoding/decoding in a 32+8-bit wide memory channel.

In contrast with FIGS. 5A-5B, FIGS. 6A-6B show a narrow memory channel. In FIG. 6A (and in FIG. 6B), each burst in the memory transaction transmits 40 bits: 32 bits of data and eight bits of non-data. A total of 16 bursts will deliver a total of 512 bits of data per memory transaction, and 128 bits of metadata/ECC per memory transaction.

Within each burst, of the eight bits allocated for non-data, four bits are used for error detection/correction, and four bits are used for metadata. The four bits used for error detection/correction may be considered for this example a "base number" of bits 505 that are always used for error detection/correction; the remaining non-data bits may be used for error detection/correction or for metadata, depending on the specific implementation.

Figure 6B:
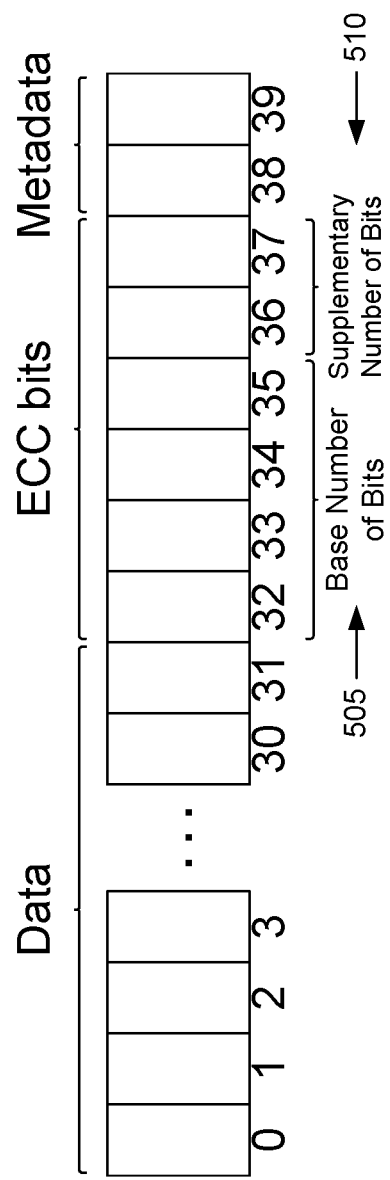

In contrast with FIG. 6A, in FIG. 6B the same 40 bits are shown. But in FIG. 6B, while base number of bits 505 remains the same (four bits), the other non-data bits are not allocated entirely for metadata. Instead, two of these bits are allocated for metadata, and the other two bits are allocated for error detection/correction. These two additional bits allocated for error detection/correction may be considered for this example as "supplementary number" of bits 510. Because six of the eight non-data bits are actually used for error correction in FIG. 6B, FIG. 6B offers superior error detection/correction when compared with FIG. 6A.

Figure 7:
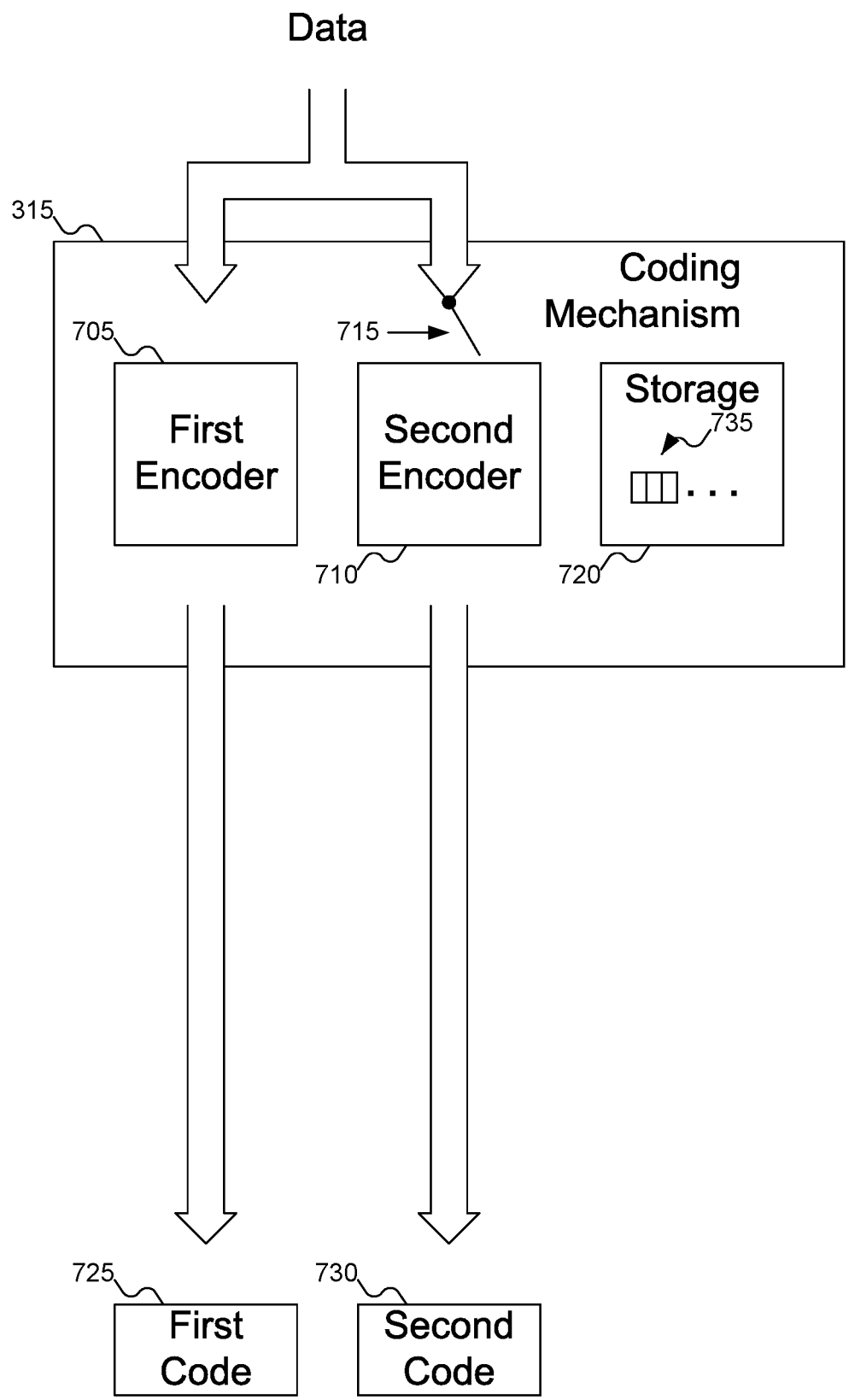
FIG. 7 shows the coding mechanism of FIGS. 3-4, according to a first embodiment of the inventive concept.

FIG. 7 shows coding mechanism 315 of FIGS. 3-4, according to a first embodiment of the inventive concept. In FIG. 7, coding mechanism 315 is shown as including encoders 705 and 710, switch 715, and storage 720. Encoders 705 and 710 may take input data and generate codes 725 and 730 from that data. Encoder 705 may be thought of as a primary encoder that is always used to code the data regardless of whether or not encoder 710 is used. Encoder 710 may be thought of as a secondary encoder: encoder 710 is used only if switch 715 is closed. Switch 715, in turn, may be opened or closed depending on the value of mode register 735 as stored in storage 720.

For example, encoder 705 might generate an error detection code based on the input data using base number of bits 505 of FIGS. 5A-6B (for example, five bits in FIGS. 5A-5B, or four bits in FIGS. 6A-6B. Then, (secondary) encoder 710 may be used to produce additional bits of additional error correcting code depending whether secondary number of bits 510 of FIGS. 5A-6B is positive (for example, one bit in FIG. 5B, or two bits in FIG. 6B).

Mode register 735 may be set to a value that indicates whether switch 715 is open or closed, so that encoder 710 is active. Since only one switch is used in FIG. 7, mode register 735 might include only one bit of data: for example, if that bit is set to 0 switch 715 might be open, and if that bit is set to 1 switch 715 might be closed. Mode register 735 may indicate whether switch 715 (or any additional switches, as described below with reference to FIGS. 9 and 11) are open or closed using any desired approach.

Figure 8:
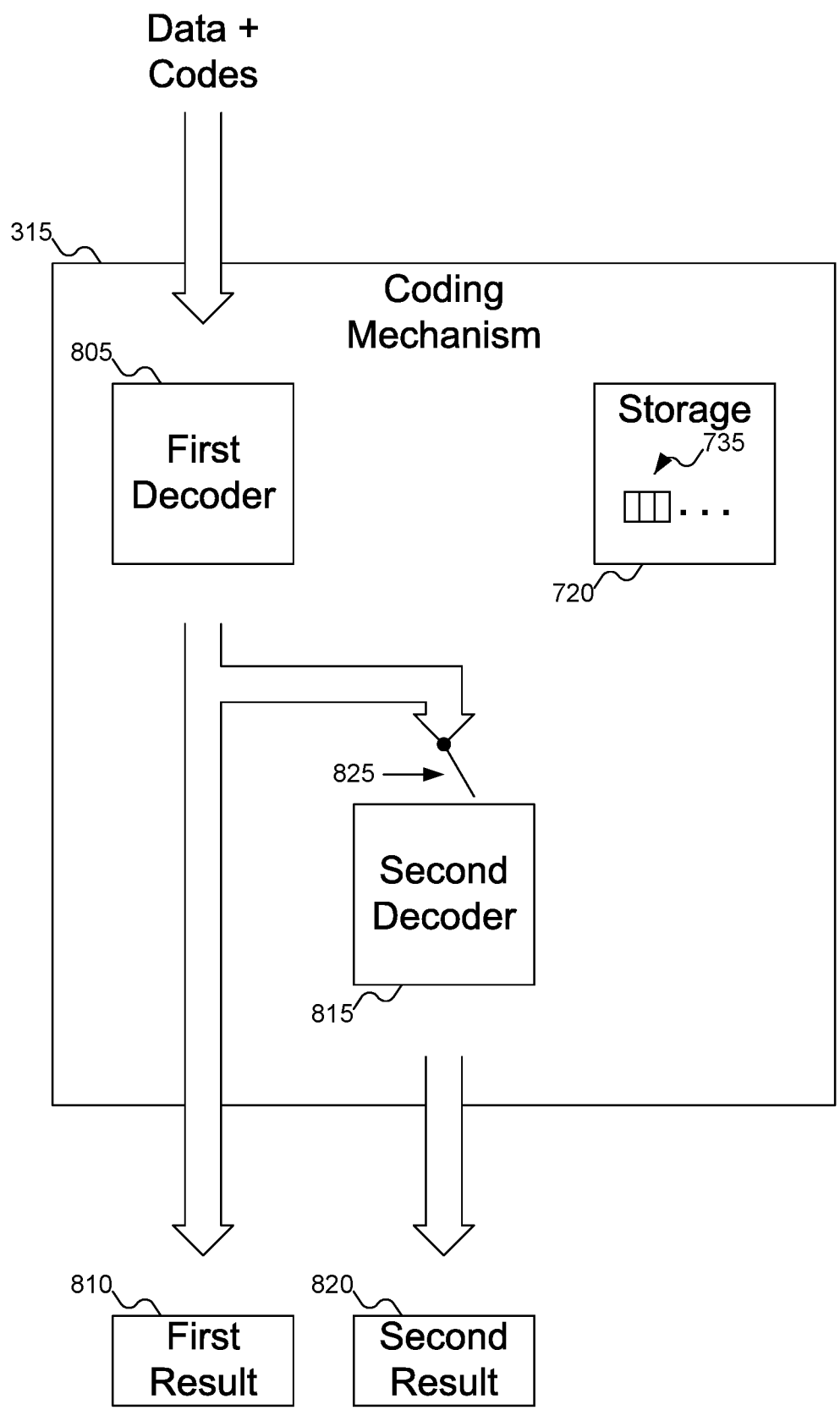
FIG. 8 shows the coding mechanism of FIGS. 3-4, according to a second embodiment of the inventive concept.

While FIG. 7 shows how coding mechanism 315 of FIGS. 3-4 may generate codes that may be used as error correcting codes, coding mechanism 315 of FIG. 7 does not use those error correcting codes to verify and/or correct that data was correctly transmitted. FIG. 8 shows coding mechanism 315 of FIGS. 3-4, according to a second embodiment of the inventive concept, which may decode such codes.

In FIG. 8, coding mechanism is shown receiving data and codes, such as codes 725 and 730 of FIG. 7. This information is input to decoder 805, which performs an initial decoding of the data based on base number of bits 505 of FIGS. 5A-6B, producing result 810. But if supplementary number of bits 510 of FIGS. 5B and 6B is non-zero, then the output of decoder 805 (possibly alongside the data and the codes input to coding mechanism 315) may also be passed to decoder 815 to perform an additional decoding based on supplementary number of bits 510 of FIGS. 5B and 6B. The result of second decoder 815 is shown as result 820. Whether second decoder 815 is used may be controlled by switch 825, which is opened or closed based on mode register 735. If both results 810 and 820 are used, one may expect better determination of the data: for example, both error detection and correction, or improved error detection or improved error correction, over using just result 810.

Figure 9:
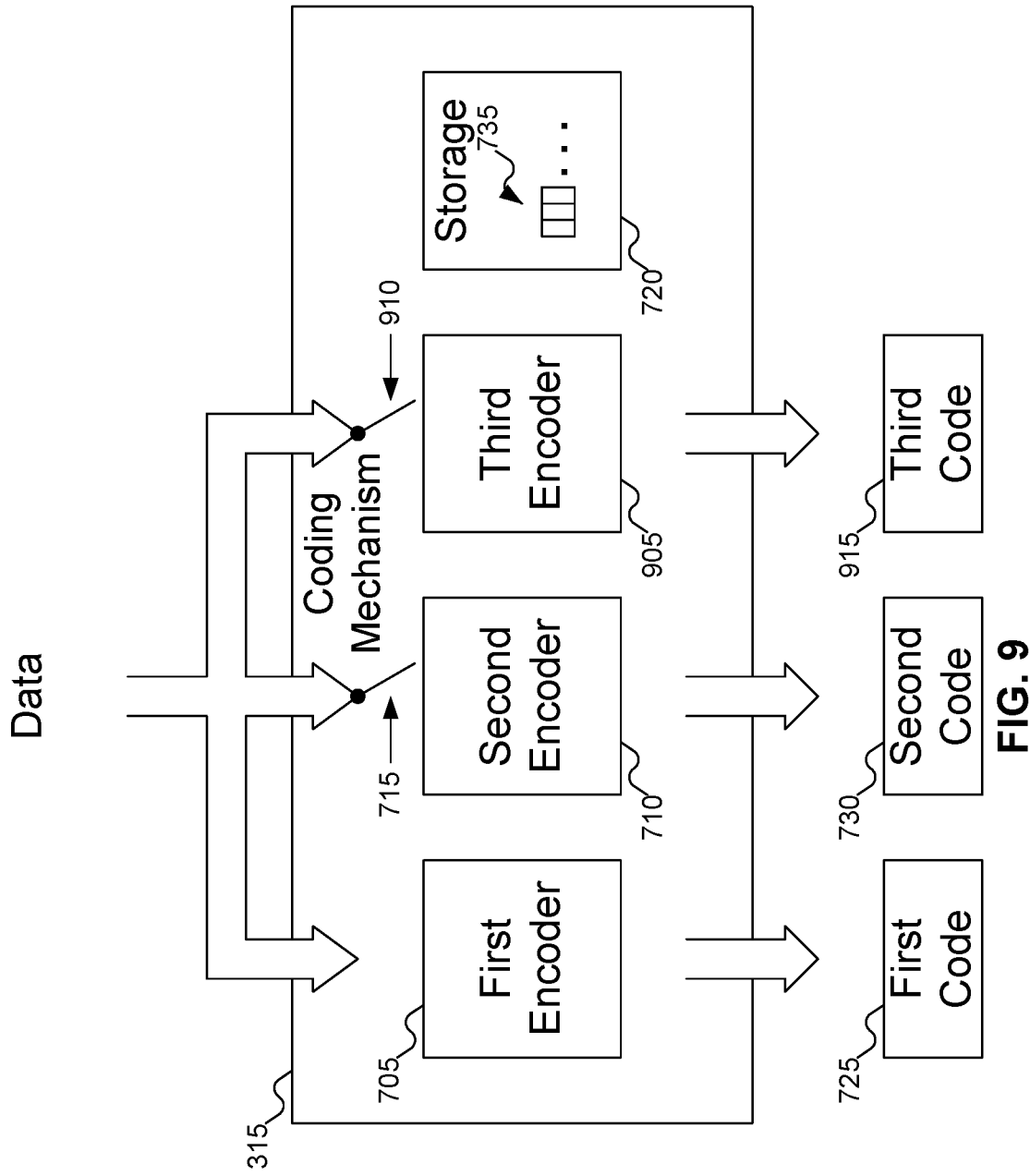
FIG. 9 shows the coding mechanism of FIGS. 3-4, according to a third embodiment of the inventive concept.

While FIGS. 7-8 show coding mechanism 315 performing encoding and decoding using two levels of encoders or decoders, embodiments of the inventive concept may support any number of encoders or decoders, in any number of levels using any desired configuration. FIG. 9 shows coding mechanism 315 of FIGS. 3-4, according to a third embodiment of the inventive concept. In FIG. 9, coding mechanism 315 is shown as including encoders 705, 710, and 905, switches 715 and 910, and storage 720. Encoder 905, like encoders 705 and 710, may take input data and generate code 915 from that data. Encoders 710 and 905 may be activated in any desired combination, based on switches 715 and 910. For example, switches 715 and 910 may both be open, in which case only encoder 705 is used to generate code 725. Or switches 715 and 910 may both be closed, in which case encoders 705, 710, and 905 are all used, to generate codes 725, 730, and 915, respectively. Or, only one of switches 715 and 910 may be closed (and the other open), in which case only one of encoders 710 and 905 is used to generate code 730 or 915, respectively. Switches 715 and 910 may be managed using the value in mode register 735.

Again, for example, encoder 705 might generate an error detection code based on the input data, using the five base number of bits 505 of FIGS. 5A-5B or the four base number of bits 505 of FIGS. 6A-6B. Then, secondary encoders 710 or 905 may be used to produce an additional one or two (or more) bits of error correcting code, depending on whether secondary number of bits 510 of FIGS. 5B and 6B is at least one or two.

Since FIG. 9 includes two switches 715 and 910, mode register 735 may need more than one bit to support all pertinent combinations of switches 715 and 910 being open or closed. For example, the lowest order bit of mode register 735 might specify whether switch 715 is open or closed, the next lowest order bit of mode register 735 might specify whether switch 910 is open or closed, and so on. Mode register 735 may indicate which switches are open or closed using any desired approach.

Figure 10:
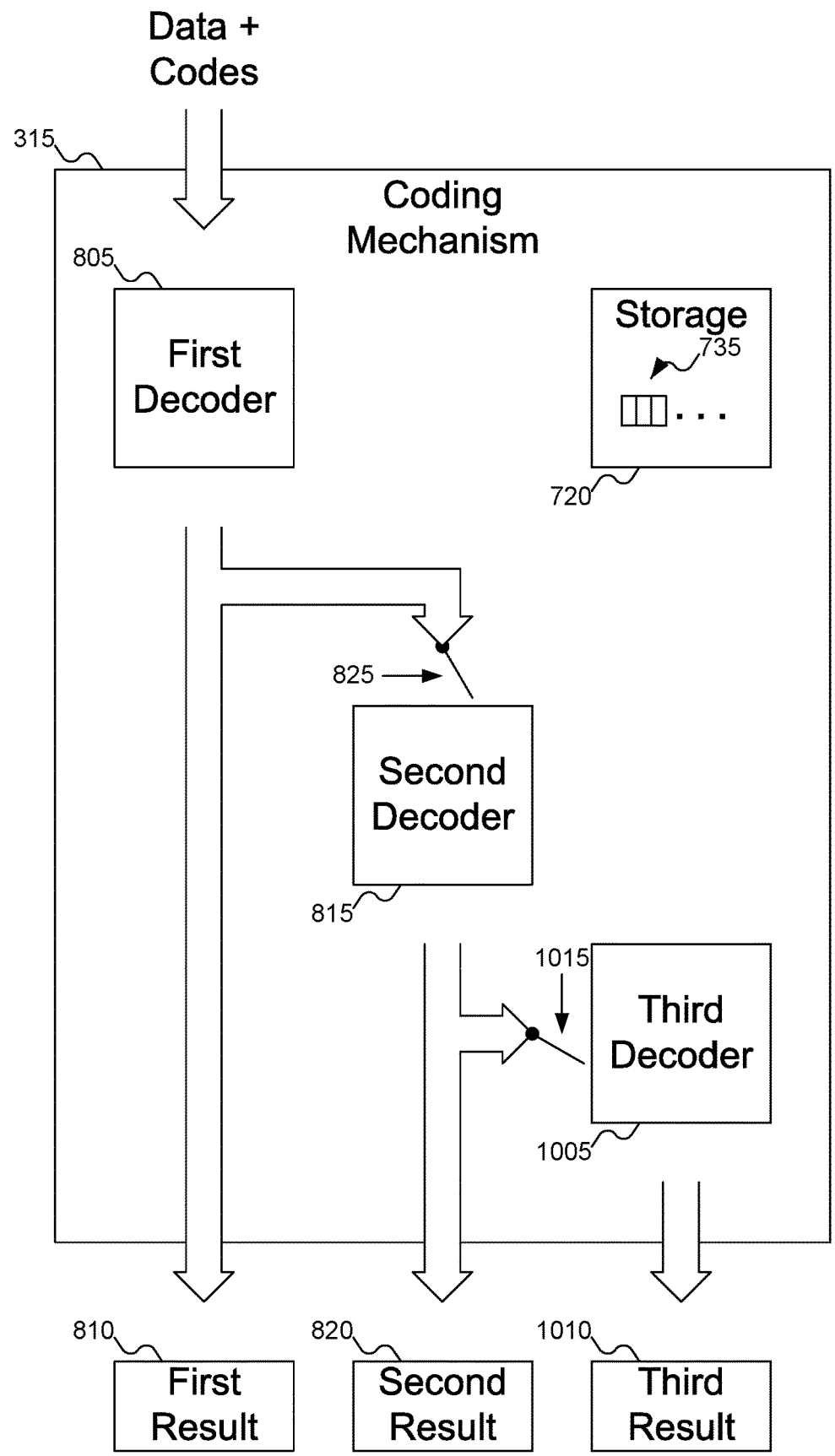
FIG. 10 shows the coding mechanism of FIGS. 3-4, according to a fourth embodiment of the inventive concept.

FIG. 9 shows coding mechanism 315 of FIGS. 3-4 performing encoding using three encoders 705, 710 and 905. In a similar manner, coding mechanism 315 of FIGS. 3-4 may also perform decoding using more than two decoders. FIG. 10 shows an example of such a coding mechanism, according to a fourth embodiment of the inventive concept.

In FIG. 10, coding mechanism 315 is shown receiving data and codes, such as codes 725, 730, and 915 of FIGS. 7 and 9. As described above with reference to FIG. 8, this information is input to decoder 805, which performs an initial decoding of the data based on base number of bits 505 of FIGS. 5A-6B, producing result 810. If supplementary number of bits 510 of FIGS. 5B and 6B is non-zero, then the output of decoder 805 (potentially alongside the data and codes) may also be passed to decoder 815 to perform an additional decoding based on supplementary number of bits 510 of FIGS. 5B and 6B. The result of second decoder 815 is shown as result 820. If supplementary number of bits 510 of FIGS. 5B and 6B includes more bits than would be generated by just decoder 815, then the output of decoder 815 (again, potentially alongside the data and code) may also be passed to decoder 1005 to perform an additional decoding based on supplementary number of bits 510 of FIGS. 5B and 6B. The result of third decoder 1005 is shown as result 1010. Whether third decoder 1005 is used may be controlled by switch 1015, which is opened or closed based on mode register 735. Using all of results 810, 820, and 1010 may be expected to provide a better determination of the data: for example, both error detection and correction, or improved error detection or improved error correction, over using just results 810 and 820.

Figure 11:
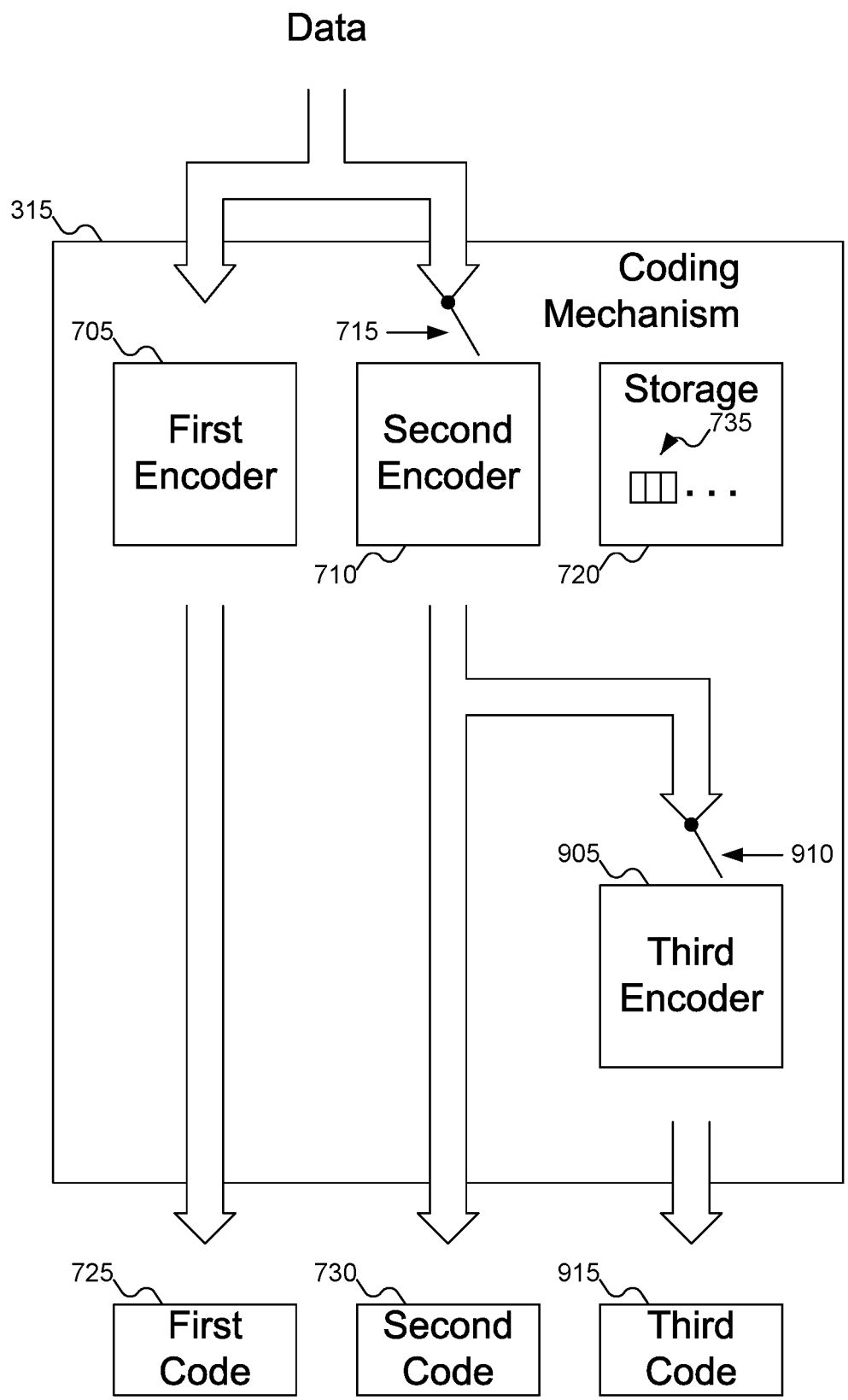
FIG. 11 shows the coding mechanism of FIGS. 3-4, according to a fifth embodiment of the inventive concept.

In the embodiments of the inventive concept shown in FIGS. 7-10, encoding is done using optional parallel encoders 710 and 905 of FIGS. 7 and 9, whereas decoding is done using cascading decoders 815 and 1005 of FIGS. 8 and 10. But embodiments of the inventive concept include coding mechanism 315 of FIGS. 3-4 that may perform encoding using cascading encoders (or combinations of parallel and cascading encoders), and that may perform decoding using parallel decoders (or combinations of parallel and cascading decoders). FIG. 11 shows coding mechanism 315 of FIGS. 3-4, according to a fifth embodiment of the inventive concept, which uses cascading encoders.

In FIG. 11, coding mechanism 315 is shown as including encoders 705, 710, and 905, switches 715 and 910, and storage 720, all of which operate similarly to FIG. 9. But instead of encoder 905 being an alternative to encoder 710, encoder 905 may optionally supplement encoder 710. That is, encoder 905 in FIG. 11 is not used unless encoder 710 of FIG. 11 is also used. Therefore, encoder 905 is used only if switches 715 and 910 are both closed. Switches 715 and 910, in turn, may be opened or closed depending on the value of mode register 735 as stored in storage 720.

Again, for example, encoder 705 might generate an error detection code based on the input data, using the five base number of bits 505 of FIGS. 5A-5B or the four base number of bits 505 of FIGS. 6A-6B. Then, secondary encoder 710 may be used to produce an additional one or two (or more) bits of error correcting code, depending on whether secondary number of bits 510 of FIGS. 5B and 6B is at least one or two. If no metadata bits are needed at all—that is, secondary number of bits 510 of FIGS. 5B and 6B is greater than the number of bits generated by encoder 710—then tertiary encoder 905 may also be used to generate further and more-capable error correcting codes using the additional secondary bits.

In embodiments of the inventive concept that use cascading encoders, as with coding mechanism 315 of FIGS. 8 and 10, the encoders that are lower in the cascade may receive as input the output of earlier encoders, and may also possibly receive the original data. Thus, for example, encoder 905 of FIG. 11 may receive code 730 of FIG. 11, and may also receive the original data, to generate code 915 of FIG. 11.

As in FIG. 9, since FIG. 11 includes two switches 715 and 910, mode register 735 may need more than one bit to support all pertinent combinations of switches 715 and 910 being open or closed. For example, the lowest order bit of mode register 735 might specify whether switch 715 is open or closed, the next lowest order bit of mode register 735 might specify whether switch 910 is open or closed, and so on. Mode register 735 may indicate which switches are open or closed using any desired approach.

For purposes of this discussion, the term "coder" is intended to be a generic term covering both encoders and decoders. Similarly, for purpose of this discussion, the term "error management" is intended to be a generic term covering both the generation of error detection and/or correction codes (as with coding mechanism 315 of FIGS. 7, 9, and 11) and the use of such codes in detecting and correcting any errors (as with coding mechanism 315 of FIGS. 8 and 10). In addition, the term "error management" is intended to cover all variations of error detection and correction. Thus, for example, if code 725 of FIGS. 7, 9, and 11 provides error detection capability within the original data and code 730 of FIGS. 7, 9, and 11 provides error correction capability within the original data, both are considered "error management". Similarly, if code 725 of FIGS. 7, 9, and 11 offers a weak error detection or error correction result and code 730 of FIGS. 7, 9, and 11 offers a strong error detection or error correction, both are considered "error management".

FIGS. 7-11 present specific embodiments of the inventive concept. But other embodiments of the inventive concept may support any desired combination of encoders or decoders. Thus, for example, coding mechanism 315 of FIGS. 3-4 could include some coders that cascade and other coders that are alternatives. Or, coding mechanism 315 of FIGS. 3-4 could have one coder at the top of a cascade, with multiple alternative coders at a lower level of the cascade. All such combinations of coder cascades and alternatives are included as embodiments of the inventive concept. Again, the value in mode register 735 may control which switches are open and which are closed, using any desired mapping from the value in mode register 735 to switches 715 and 910. In addition, embodiments of the inventive concept may support both encoding and decoding mechanisms, in any desired configurations. For example, coding mechanism 315 of FIGS. 3-4 may include both encoders, such as those shown in FIGS. 7, 9, and 11, and decoders, such as those shown in FIGS. 8 and 10.

In addition, FIG. 7 shows only two encoders 705 and 710, and FIGS. 9 and 11 each show three encoders 705, 710, and 905. Similarly, FIG. 8 shows two decoders 805 and 825, whereas FIG. 10 shows three decoders 805, 825, and 1005. Embodiments of the inventive concept may support any number of coders, and in any desired configuration. The minimum number of coders required for embodiments of the inventive concept is the inclusion of two coders, such as encoders 705 and 710 or decoders 805 and 815, where one coder, such as encoder 705 or decoder 805, is always active and one coder, such as encoder 710 or decoder 815, may be used to supplement the first coder.

As mentioned above, encoders 705, 710, and 905 of FIGS. 7, 9 and 11, and decoders 805, 815, and 1005 of FIGS. 8 and 10, may share hardware implementations. As an example, encoders 705, 710, and 905 of FIGS. 7, 9 and 11 may be implemented as a single encoder that generates all possible ECC bits: switches 715 and 910 of FIGS. 7, 9 and 11 may then select which ECC bits are output from coding mechanism 315 of FIGS. 7, 9 and 11: just the error detection bits, some of the error correction bits, and/or all of the error correction bits (or, for embodiments of the inventive concept that support weak versus strong error detection/correction, just the weak error detection/correction bits, some of the strong error detection/correction bits, or all of the strong error detection/correction bits).

Supplementary number of bits 510 of FIGS. 5B and 6B might actually include two or more sets of bits. For example, assume that in FIGS. 5B and 6B no metadata bits were needed. Then supplementary number of bits 510 of FIG. 5B would be three, and supplementary number of bits 510 of FIG. 6B would be four. But it might happen that there is no second coder in coding mechanism 315 of FIGS. 7, 9 and 11 that may support generate four code bits. In such an embodiment of the inventive concept, encoder 710 of FIGS. 7, 9 and 11 might be used to generate code 730 of FIGS. 7, 9 and 11 that adds two bits of error correction capability, and encoder 905 of FIGS. 9 and 11 might be used to generate code 915 of FIGS. 9 and 11 that adds an additional two bits of error correction capability.

Where there is only one secondary coder (be it either an encoder or a decoder), one single supplementary number of bits 510 of FIGS. 5B and 6B may suffice. But where there are multiple secondary coders (or, alternatively or in combination, a secondary coder, a tertiary coder, and so on), there are alternative ways to manage when to activate these various coders. In some embodiments of the inventive concept, there may be multiple supplementary numbers of bits 510 of FIGS. 5B and 6B, each managing different numbers of bits supported by the various secondary coders. For example, consider coding mechanism 315 of FIG. 11. Encoder 710 might be used to provide two additional bits of code as second code 730, and encoder 905 might provide a third additional bit of code as third code 915. To represent this, supplementary number of bits 510 of FIGS. 5B and 6B might actually include two supplementary numbers of bits. Then, if the system requires three bits for metadata, both of these values may be set to zero, indicating that there are no available bits for supplementary error correcting codes. But if the system only requires one bit for metadata: one of the supplementary numbers of bits may be set to two. And if the system requires no bits for metadata, one of the supplementary numbers of bits may be set to two and the other supplementary number of bits may be set to one. From this information, mode register 735 of FIG. 11 may be set to activate encoders 710 and 905 of FIG. 11 as appropriate for the available supplementary numbers of bits.

In other embodiments of the inventive concept, supplementary number of bits 510 of FIGS. 5B and 6B may represent, as a single value, all the additional bits (beyond those represented as base number of bits 505 of FIGS. 5A-6B) not being used as metadata. Then, coders may be activated as appropriate to make use of all the available bits. In such embodiments of the inventive concept, supplementary number of bits 510 of FIGS. 5B and 6B may be set to zero, two, or three (or other values, depending on the values of base number of bits 505 of FIGS. 5B and 6B and supplementary number of bits 510 of FIGS. 5B and 6B), depending on how many bits are needed for metadata. Then, by comparing this value against the known numbers of bits generated by encoders 710 and 905 of FIG. 11, mode register 735 of FIG. 11 may be set to activate encoders 710 and 905 of FIG. 11. For example, if supplementary number of bits 510 of FIGS. 5B and 6B is zero, then mode register 735 of FIG. 11 may be set to activate neither of encoders 710 and 905 of FIG. 11. If supplementary number of bits 510 of FIGS. 5B and 6B is two, then mode register 735 of FIG. 11 may be set to activate encoder 710 of FIG. 11, but not encoder 905 of FIG. 11 (since encoder 710 of FIG. 11 would generate enough bits in code 730 to use all the available supplementary bits). And if supplementary number of bits 510 of FIGS. 5B and 6B is three, then mode register 735 of FIG. 11 may be set to activate both encoders 710 and 905 of FIG. 11, to generate all three additional bits in codes 730 and 915. Since coding mechanism 315 of FIGS. 3-4 is usually implemented in hardware, the number of bits that may be generated as part of codes 730 and 915 of FIGS. 7, 9, and 11 is known in advance, making it easy to determine how many secondary coders are needed to support the maximum possible error detection/correction.

In embodiments of the inventive concept where the coders cascade (as in FIG. 11), the coders to be activated by mode register 735 of FIG. 11 (based on supplementary number of bits 510 of FIGS. 5B and 6B) require a particular sequence. Thus, for example, if encoders 710 and 905 of FIG. 11 each were to generate two bits of code (in codes 730 and 915 of FIG. 11) but supplementary number of bits 510 of FIGS. 5B and 6B were only three, then encoder 905 of FIG. 11 should not be activated (it would generate more bits than could be used). But in embodiments of the inventive concept where coders are available as alternatives, as coding mechanism 315 of FIG. 9, the coders may be selected for activation to maximize the available supplementary number of bits 510 of FIGS. 5B and 6B. For example, assume that supplementary number of bits 510 of FIGS. 5B and 6B was three, code 730 of FIG. 9 (generated by encoder 710 of FIG. 9) included two additional bits, and code 915 of FIG. 9 (generated by encoder 905 of FIG. 9) included three additional bits. To maximize the error detection/correction of the system, mode register 735 of FIG. 9 should be set to activate encoder 905 of FIG. 9 but not encoder 710 of FIG. 9. In that manner, three additional error detection/correction bits may be generated, rather than just two bits (as would be generated by encoder 710 of FIG. 9).

As described above, different hosts and memory module manufacturers may have different metadata requirements. Embodiments of the inventive concept enable both memory controller 125 of FIG. 1 and memory module 115 of FIG. 1 to support varying numbers of bits for ECC vs. metadata. As a result, both memory controller 125 of FIG. 1 and memory module 115 of FIG. 1 may support memory transactions with corresponding components that support varied ECC vs. metadata support. That is, embodiments of the inventive concept that support memory module 115 of FIG. 3 may communicate with memory controllers 125 of FIG. 1 regardless of their specific metadata requirements, offering the best ECC available given the metadata requirements of memory controller 125 of FIG. 1. And embodiments of the inventive concept that support memory controller 125 of FIG. 4 may communicate with memory modules 115 of FIG. 1 and maximize the use of their native ECC capabilities. (Of course, if a machine includes both memory module 115 of FIG. 3 and memory controller 125 of FIG. 4, then the two may use the best ECC either of them individually support.) Put another way, for example, in embodiments of the inventive concept that use NVDIMM memory, the NVDIMM memory module may vary the level of ECC support provided based on the number of bits of metadata required by the host. As another example, in other embodiments of the inventive concept that use DDR5 memory, memory controller 125 of FIG. 1 may vary the level of ECC support based on whether the DDR5 memory maintains the current level of ECC capability or the current level of ECC overhead.

In general, the number of bits used for ECC vs. metadata is determined when machine 105 of FIG. 1 is powered up, and does not change during runtime (since a change during runtime would affect how data is interpreted upon receipt). But some embodiments of the inventive concept may support changing the number of bits used for ECC vs. metadata during runtime.

Once the number of bits to be used for ECC vs. metadata is determined, mode register 735 of FIGS. 7-11 may be set. For example, if supplementary number of bits 510 of FIG. 6B is zero, then mode register 735 of FIGS. 7-11 may be set to open switches 715 and 910 of FIGS. 7-11. If supplementary number of bits 510 of FIG. 6B is not zero, then mode register 735 of FIGS. 7-11 may be set to close the appropriate switches 715 and 910 of FIGS. 7-11 to activate the appropriate coders 710 and 905 of FIGS. 7-11 to supplement the error correcting capability of the memory transaction.

Figure 12A:
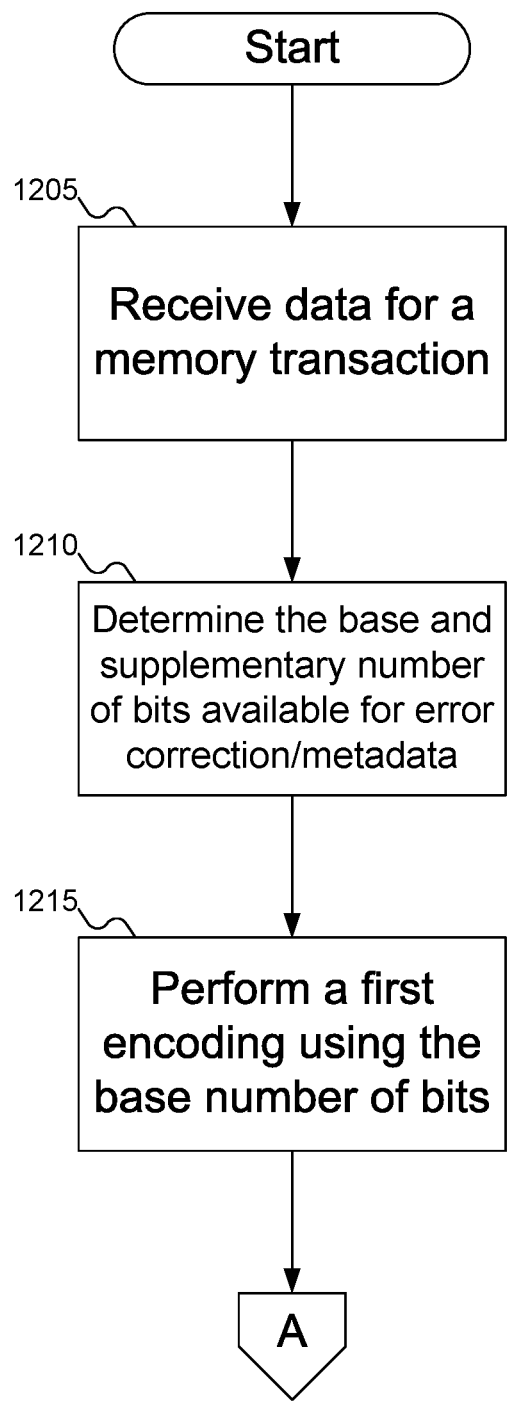
FIGS. 12A-12B show a flowchart of an example procedure to encode data for a memory transaction using the coding mechanism of FIGS. 7, 9, and 11, according to an embodiment of the inventive concept.
Figure 12B:
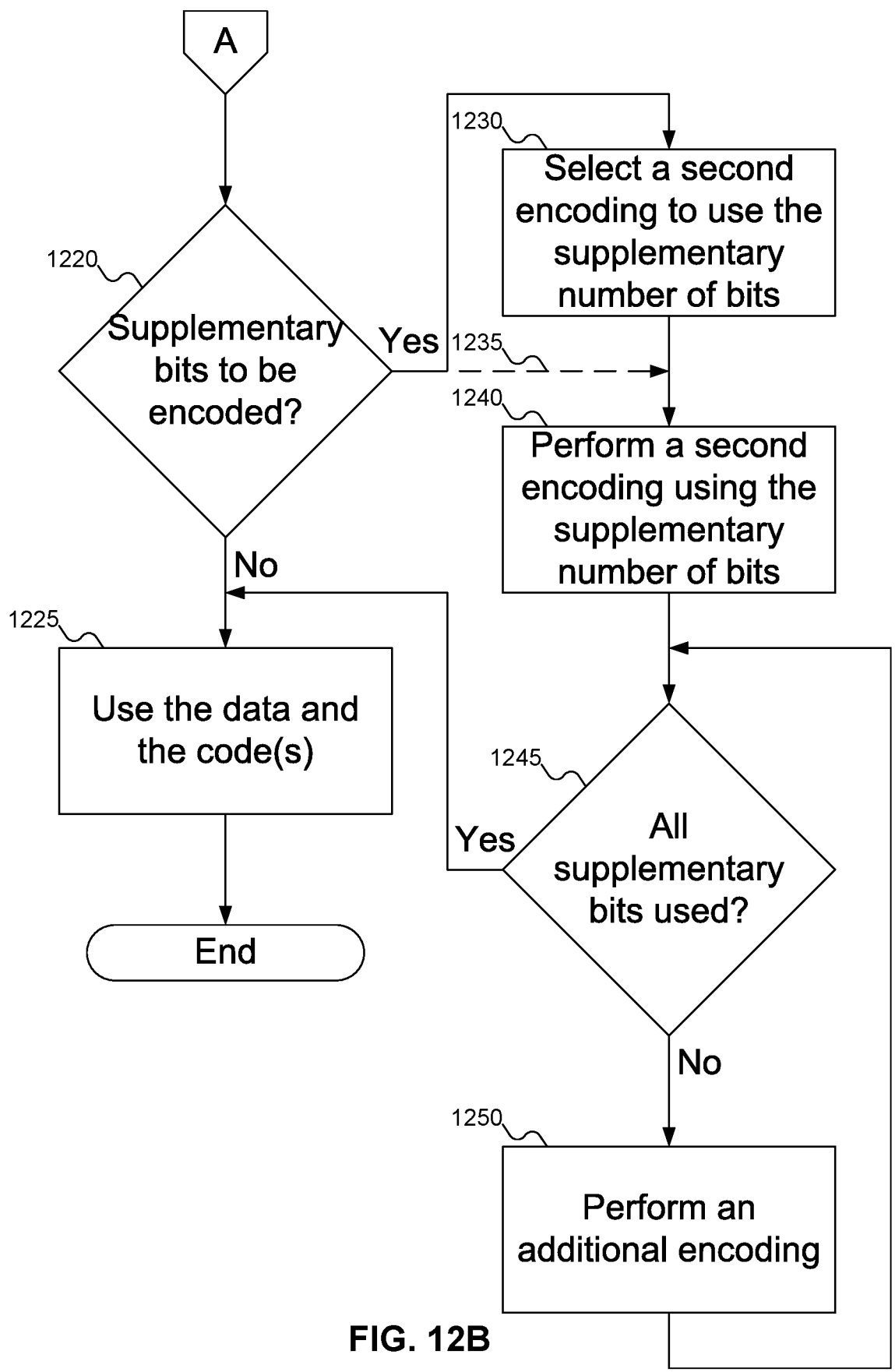

FIGS. 12A-12B show a flowchart of an example procedure for encoding data for a memory transaction, according to an embodiment of the inventive concept. In FIG. 12A, at block 1205, coding mechanism 315 of FIGS. 7, 9, and 11 may receive data for a memory transaction. At block 1210, coding mechanism 315 of FIGS. 7, 9, and 11 may determine base number of bits 505 of FIGS. 5A-6B and supplementary number of bits 510 of FIGS. 5B and 6B available for use in error detection and correction. At block 1215, first encoder 705 of FIGS. 7, 9, and 11 may perform a first encoding using base number of bits 505 of FIGS. 5A-6B.

At block 1220 (FIG. 12B), coding mechanism 315 of FIGS. 7, 9, and 11 may determine if there are any supplementary bits available to be encoded (or if all the remaining bits are being used for metadata). If there are no supplementary bits available to be encoded, then at block 1225 the memory transaction may be performed using the data and first code 725 of FIGS. 7, 9, and 11 (either by memory module 115 of FIG. 3 or memory controller 125 of FIG. 4). Otherwise, at block 1230 a secondary encoder is selected to use the supplementary number of bits. Block 1230 is optional, as shown by dashed line 1235. For example, when coding mechanism 315 of FIGS. 7 and 11 is used, there may be only one encoder available to be selected at any one "level" of coding mechanism 315 of FIGS. 7 and 11. But when coding mechanism 315 of FIG. 9 is used, there may be any number of encoders available to be selected at any one "level" of coding mechanism 315 of FIG. 9. Therefore, an encoder might need to be selected. An encoder may be selected according to any criterion: for example, one that uses the most of the available bits for encoding, or one that provides a specific type of encoding.

Once an encoder has been selected, at block 1240, a secondary encoding may be performed using the selected encoder. At block 1245, coding mechanism 315 of FIGS. 7, 9, and 11 may determine if there are any remaining supplementary bits that may be encoded. If so, then at block 1250 an additional encoding may be performed (essentially repeating blocks 1230 and 1240). Otherwise, control may pass to block 1225 to use the data and the codes in a memory transaction.

Figure 13A:
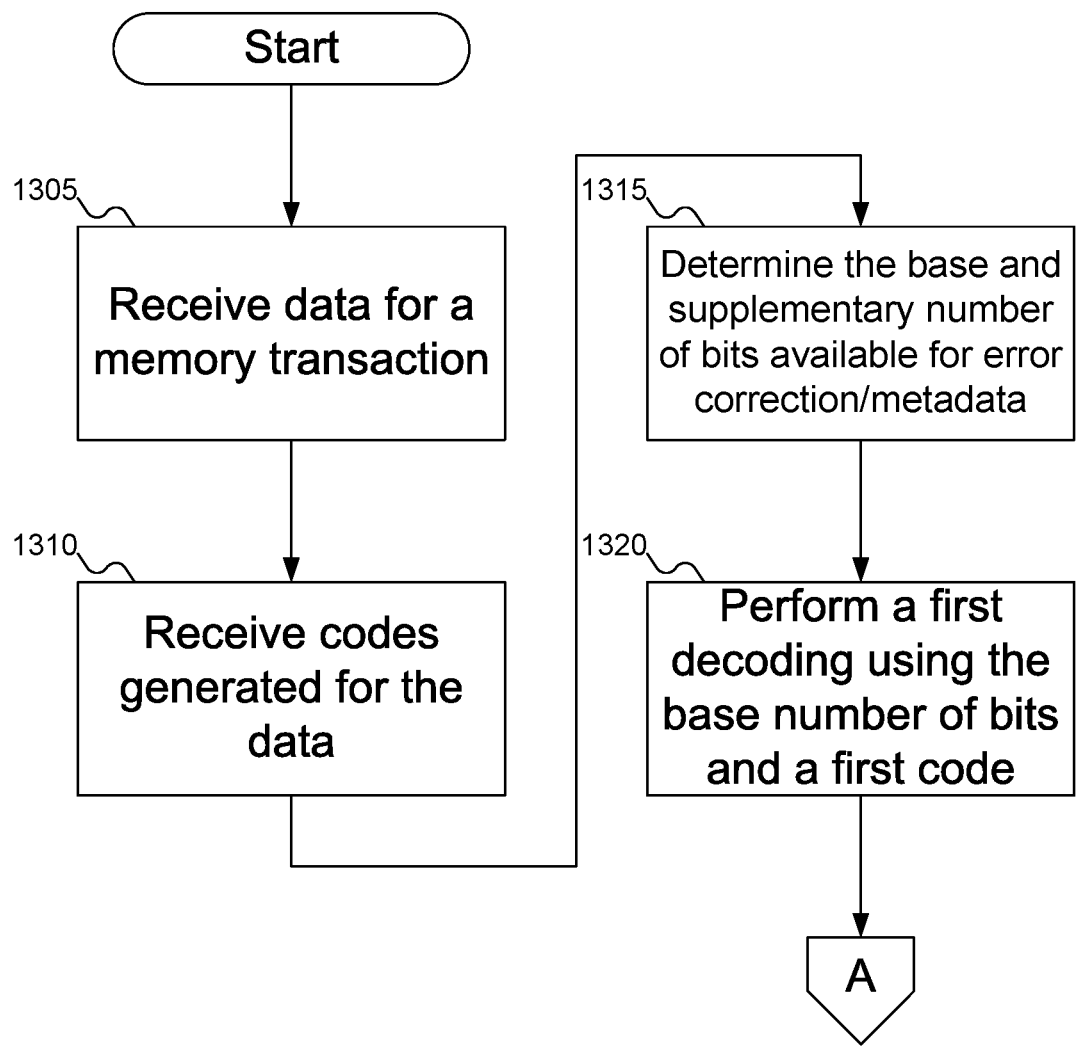
FIGS. 13A-13B show a flowchart of an example procedure to decode data for a memory transaction using the coding mechanism of FIGS. 8 and 10, according to an embodiment of the inventive concept.
Figure 13B:
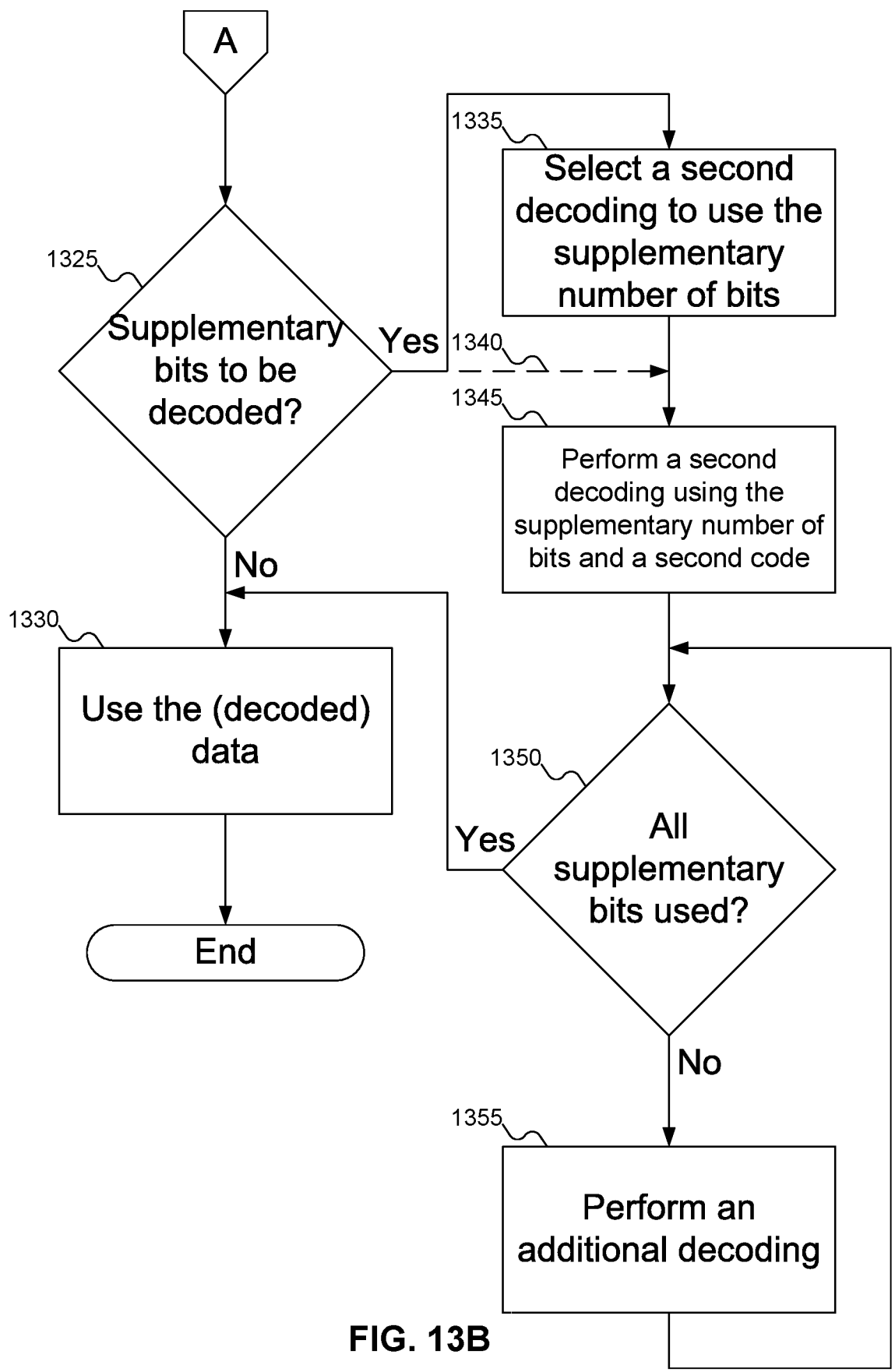

FIGS. 13A-13B show a flowchart of an example procedure to decode data for a memory transaction using the coding mechanism of FIGS. 8 and 10, according to an embodiment of the inventive concept. In FIG. 13A, at block 1305, coding mechanism 315 of FIGS. 8 and 10 may receive data for a memory transaction. At block 1310, coding mechanism 315 of FIGS. 8 and 10 may receive codes for the data in the memory transaction. Note that blocks 1305 and 1310 may be performed as a single action, rather than separate actions as suggested by blocks 1305 and 1310. At block 1315, coding mechanism 315 of FIGS. 8 and 10 may determine base number of bits 505 of FIGS. 5A-6B and supplementary number of bits 510 of FIGS. 5B and 6B available for use in error detection and correction. At block 1320, first decoder 805 of FIGS. 8 and 10 may perform a first decoding using base number of bits 505 of FIGS. 5A-6B.

At block 1325 (FIG. 13B), coding mechanism 315 of FIGS. 8 and 10 may determine if there are any supplementary bits available to be decoded (or if all the remaining bits are being used for metadata). If there are no supplementary bits available to be decoded, then at block 1330 the memory transaction may be performed using the data and first result 810 of FIGS. 8 and 10 (either by memory module 115 of FIG. 3 or memory controller 125 of FIG. 4). Otherwise, at block 1335 a secondary decoder is selected to use the supplementary number of bits. Block 1335 is optional, as shown by dashed line 1340. For example, while coding mechanism 315 of FIGS. 8 and 10 shows only one decoder available to be selected at any one "level" of coding mechanism 315 of FIGS. 8 and 10, other implementations might offer multiple decoders at any level of coding mechanism 315 of FIGS. 8 and 10. Therefore, a decoder might need to be selected. A decoder may be selected according to any criterion: for example, one that uses the most of the available bits for decoding, or one that provides a specific type of decoding.

Once a decoder has been selected, at block 1345, a secondary decoding may be performed using the selected decoder. At block 1350, coding mechanism 315 of FIGS. 8 and 10 may determine if there are any remaining supplementary bits that may be decoded. If so, then at block 1355 an additional decoding may be performed (essentially repeating blocks 1335 and 1345). Otherwise, control may pass to block 1330 to use the data and the results in a memory transaction.

Figure 14:
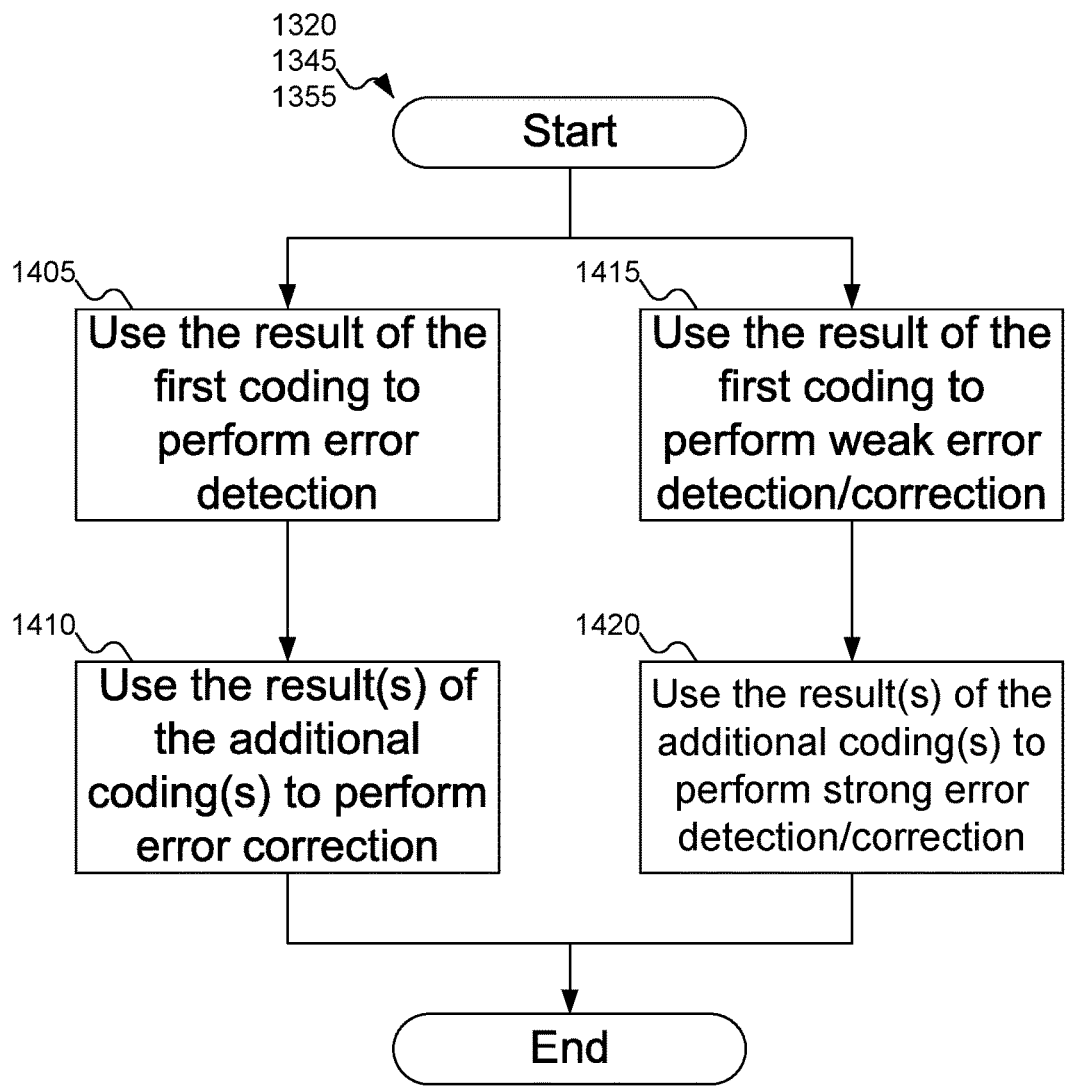
FIG. 14 shows a flowchart of an example procedure for using codes to support error detection and correction.

FIG. 14 shows a flowchart of an example procedure for using codes to support error detection and correction. In FIG. 14, at block 1405, code 725 of FIGS. 7, 9, and 11 may be used to perform error detection, and at block 1410 codes 725, 730, and 915 of FIGS. 7, 9, and 11 may be used to perform both error detection and correction. Alternatively, at block 1415, code 725 of FIGS. 7, 9, and 11 may be used to perform a weak coding (either error detection or error correction), and at block 1420 codes 725, 730, and 915 of FIGS. 7, 9, and 11 may be used to perform a strong coding (again, either error detection or error correction).

In FIGS. 12A-14, some embodiments of the inventive concept are shown. But a person skilled in the art will recognize that other embodiments of the inventive concept are also possible, by changing the order of the blocks, by omitting blocks, or by including links not shown in the drawings. All such variations of the flowcharts are considered to be embodiments of the inventive concept, whether expressly described or not.

The following discussion is intended to provide a brief, general description of a suitable machine or machines in which certain aspects of the inventive concept may be implemented. The machine or machines may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines may include embedded controllers, such as programmable or non-programmable logic devices or arrays, Application Specific Integrated Circuits (ASICs), embedded computers, smart cards, and the like. The machine or machines may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciate that network communication may utilize various wired and/or wireless short range or long range carriers and protocols, including radio frequency (RF), satellite, microwave, Institute of Electrical and Electronics Engineers (IEEE) 802.11, Bluetooth®, optical, infrared, cable, laser, etc.

Embodiments of the present inventive concept may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Embodiments of the inventive concept may include a tangible, non-transitory machine-readable medium comprising instructions executable by one or more processors, the instructions comprising instructions to perform the elements of the inventive concepts as described herein.

Having described and illustrated the principles of the inventive concept with reference to illustrated embodiments, it will be recognized that the illustrated embodiments may be modified in arrangement and detail without departing from such principles, and may be combined in any desired manner. And, although the foregoing discussion has focused on particular embodiments, other configurations are contemplated. In particular, even though expressions such as "according to an embodiment of the inventive concept" or the like are used herein, these phrases are meant to generally reference embodiment possibilities, and are not intended to limit the inventive concept to particular embodiment configurations. As used herein, these terms may reference the same or different embodiments that are combinable into other embodiments.

The foregoing illustrative embodiments are not to be construed as limiting the inventive concept thereof. Although a few embodiments have been described, those skilled in the art will readily appreciate that many modifications are possible to those embodiments without materially departing from the novel teachings and advantages of the present disclosure. Accordingly, all such modifications are intended to be included within the scope of this inventive concept as defined in the claims.

Embodiments of the inventive concept may extend to the following statements, without limitation:

Statement 1. An embodiment of the inventive concept includes a coding mechanism implemented in hardware, comprising:

a first encoder to produce a first code for a data, the first code including a base number of bits;

a second encoder to produce a second code for the data, the second code including a supplementary number of bits;

storage for a mode register; and a switch responsive to the mode register to control whether or not the second encoder is used, wherein the first encoder is always used to produce the first code and the second encoder is optionally used to produce the second code, and wherein the second code together with the first code provides a stronger encoding than the first code alone.

Statement 2. An embodiment of the inventive concept includes a coding mechanism according to statement 1, wherein the coding mechanism is embodied in a memory module.

Statement 3. An embodiment of the inventive concept includes a coding mechanism according to statement 2, wherein the memory module includes a Non-Volatile Dual In-Line Memory Module (NVDIMM).

Statement 4. An embodiment of the inventive concept includes a coding mechanism according to statement 3, wherein the coding mechanism communicates using a NVDIMM-P protocol.

Statement 5. An embodiment of the inventive concept includes a coding mechanism according to statement 1, wherein the coding mechanism is embodied in a memory controller.

Statement 6. An embodiment of the inventive concept includes a coding mechanism according to statement 1, wherein:

the coding mechanism further includes a third encoder to produce a third code for the data using the supplementary number of bits; and the switch is operative select among using the second encoder, using the third encoder, or using neither the second encoder nor the third encoder responsive to the mode register.

Statement 7. An embodiment of the inventive concept includes a coding mechanism according to statement 1, wherein:

the coding mechanism further includes a third encoder to produce a third code for the data using a second supplementary number of bits; and the switch is operative select among using the second encoder, using both the second encoder and the third encoder, or using neither the second encoder nor the third encoder responsive to the mode register.

Statement 8. An embodiment of the inventive concept includes a coding mechanism according to statement 1, wherein the mode register is operative to store a value indicating whether or not the switch is to use the second encoder.

Statement 9. An embodiment of the inventive concept includes a coding mechanism according to statement 8, wherein the mode register is operative to store the value indicating whether or not the switch is to use the second encoder responsive to whether or not the supplementary number of bits is greater than zero.

Statement 10. An embodiment of the inventive concept includes a coding mechanism according to statement 1, wherein the first encoder and the second encoder share a partial hardware implementation.

Statement 11. An embodiment of the inventive concept includes a coding mechanism implemented in hardware, comprising:

a first decoder to produce a first result for a data and a first code, the first code including a base number of bits;

a second decoder to produce a second result for the data and at least a second code, the second code including a supplementary number of bits;

storage for a mode register; and a switch responsive to the mode register to control whether or not the second decoder is used, wherein the first decoder is always used to produce the first result and the second decoder is optionally used to produce the second result, and wherein the second result together with the first result provides a stronger decoding than the first result alone.

Statement 12. An embodiment of the inventive concept includes a coding mechanism according to statement 11, wherein the second decoder is operative to produce the second result responsive to the data, the first code, and the second code.

Statement 13. An embodiment of the inventive concept includes a coding mechanism according to statement 11, wherein the coding mechanism is embodied in a memory module.

Statement 14. An embodiment of the inventive concept includes a coding mechanism according to statement 13, wherein the memory module includes a Non-Volatile Dual In-Line Memory Module (NVDIMM).

Statement 15. An embodiment of the inventive concept includes a coding mechanism according to statement 14, wherein the coding mechanism communicates using a NVDIMM-P protocol.

Statement 16. An embodiment of the inventive concept includes a coding mechanism according to statement 11, wherein the coding mechanism is embodied in a memory controller.

Statement 17. An embodiment of the inventive concept includes a coding mechanism according to statement 11, wherein:

the coding mechanism further includes a third decoder to produce a third result for the data and at least a third code using the supplementary number of bits; and the switch is operative select among using the second decoder, using the third decoder, or using neither the second decoder nor the third decoder responsive to the mode register.

Statement 18. An embodiment of the inventive concept includes a coding mechanism according to statement 11, wherein:

the coding mechanism further includes a third decoder to produce a third result for the data and at least a third code using a second supplementary number of bits; and the switch is operative select among using the second decoder, using both the second decoder and the third decoder, or using neither the second decoder nor the third decoder responsive to the mode register.

Statement 19. An embodiment of the inventive concept includes a coding mechanism according to statement 11, wherein the mode register is operative to store a value indicating whether or not the switch indicates to use the second decoder.

Statement 20. An embodiment of the inventive concept includes a coding mechanism according to statement 11, wherein the mode register is operative to store the value indicating whether or not the switch is to use the second decoder responsive to whether or not the supplementary number of bits is greater than zero.

Statement 21. An embodiment of the inventive concept includes a coding mechanism according to statement 11, wherein the first decoder and the second decoder share a partial hardware implementation.

Statement 22. An embodiment of the inventive concept includes a method, comprising:

receiving data for a memory transaction;

determining a number of bits available for error management during the memory transaction, wherein the number of bits available for error management include a base number of bits and a supplementary number of bits;

performing a first error management coding for the data based on the base number of bits; and performing a second error management coding for the data based on the supplementary number of bits.

Statement 23. An embodiment of the inventive concept includes a method according to statement 22, wherein:

performing a first error management coding for the data based on the base number of bits includes performing a first encoding for the data based on the base number of bits; and performing a second error management coding for the data based on the supplementary number of bits includes performing a second encoding for the data based on the supplementary number of bits.

Statement 24. An embodiment of the inventive concept includes a method according to statement 23, wherein:

performing a first encoding for the data based on the base number of bits includes producing a first code; and performing a second encoding for the data based on the supplementary number of bits includes producing a second code.

Statement 25. An embodiment of the inventive concept includes a method according to statement 24, wherein the second code together with the first code provides a stronger error management coding than the first code alone.

Statement 26. An embodiment of the inventive concept includes a method according to statement 22, wherein:

performing a first error management coding for the data based on the base number of bits includes performing a first decoding for the data based on the base number of bits; and performing a second error management coding for the data based on the supplementary number of bits includes performing a second decoding for the data based on the supplementary number of bits.

Statement 27. An embodiment of the inventive concept includes a method according to statement 26, wherein:

performing a first decoding for the data based on the base number of bits includes producing a first result; and performing a second decoding for the data based on the supplementary number of bits includes producing a second result.

Statement 28. An embodiment of the inventive concept includes a method according to statement 26, wherein:

performing a first decoding for the data based on the base number of bits includes performing a first decoding responsive to the data and a first code based on the base number of bits; and performing a second decoding for the data based on the supplementary number of bits includes performing a second decoding responsive to the data and at least a second code.

Statement 29. An embodiment of the inventive concept includes a method according to statement 28, wherein performing a second decoding responsive to the data and at least a second code includes performing a second decoding responsive to the data, the first code, and the second code.

Statement 30. An embodiment of the inventive concept includes a method according to statement 28, wherein receiving data for a memory transaction includes receiving the first code and the at least second code.

Statement 31. An embodiment of the inventive concept includes a method according to statement 22, wherein the method is performed by one of a Dual In-Line Memory Module (DIMM) and a memory controller.

Statement 32. An embodiment of the inventive concept includes a method according to statement 31, wherein the DIMM includes a Non-Volatile Dual In-Line Memory Module (NVDIMM).

Statement 33. An embodiment of the inventive concept includes a method according to statement 22, wherein performing a second error management coding for the data based on the supplementary number of bits includes performing the second error management coding for the data based on the supplementary number of bits only if the supplementary number of bits is greater than zero.

Statement 34. An embodiment of the inventive concept includes a method according to statement 22, wherein:

performing a first error management coding for the data based on the base number of bits includes supporting error detection in the data; and performing a second error management coding for the data based on the supplementary number of bits includes supporting error correction in the data.

Statement 35. An embodiment of the inventive concept includes a method according to statement 22, wherein:

performing a first error management coding for the data based on the base number of bits includes supporting weak error detection in the data; and performing a second error management coding for the data based on the supplementary number of bits includes supporting strong error detection in the data.

Statement 36. An embodiment of the inventive concept includes a method according to statement 22, wherein:

performing a first error management coding for the data based on the base number of bits includes supporting weak error correction in the data; and performing a second error management coding for the data based on the supplementary number of bits includes supporting strong error correction in the data.

Statement 37. An embodiment of the inventive concept includes a method according to statement 22, wherein performing a second error management coding for the data based on the supplementary number of bits includes performing the second error management coding for the data based on the supplementary number of bits from at least the second error management coding and a third error management coding.

Statement 38. An embodiment of the inventive concept includes a method according to statement 37, wherein performing the second error management coding for the data based on the supplementary number of bits from at least the second error management coding and a third error management coding includes performing the third error management coding for the data based on a second supplementary number of bits.

Statement 39. An embodiment of the inventive concept includes a method according to statement 38, wherein performing the third error management coding for the data based on the second supplementary number of bits includes performing the third error management coding for the data based on the supplementary number of bits.

Statement 40. An embodiment of the inventive concept includes an article, comprising a non-transitory storage medium, the non-transitory storage medium having stored thereon instructions that, when executed by a machine, result in:

receiving data for a memory transaction;

determining a number of bits available for error management during the memory transaction, wherein the number of bits available for error management include a base number of bits and a supplementary number of bits;

performing a first error management coding for the data based on the base number of bits; and performing a second error management coding for the data based on the supplementary number of bits.

Statement 41. An embodiment of the inventive concept includes an article according to statement 40, wherein:

performing a first error management coding for the data based on the base number of bits includes performing a first encoding for the data based on the base number of bits; and performing a second error management coding for the data based on the supplementary number of bits includes performing a second encoding for the data based on the supplementary number of bits.

Statement 42. An embodiment of the inventive concept includes an article according to statement 41, wherein:

performing a first encoding for the data based on the base number of bits includes producing a first code; and performing a second encoding for the data based on the supplementary number of bits includes producing a second code.

Statement 43. An embodiment of the inventive concept includes an article according to statement 42, wherein the second code together with the first code provides a stronger error management coding than the first code alone.

Statement 44. An embodiment of the inventive concept includes an article according to statement 40, wherein:

performing a first error management coding for the data based on the base number of bits includes performing a first decoding for the data based on the base number of bits; and performing a second error management coding for the data based on the supplementary number of bits includes performing a second decoding for the data based on the supplementary number of bits.

Statement 45. An embodiment of the inventive concept includes an article according to statement 44, wherein:

performing a first decoding for the data based on the base number of bits includes producing a first result; and performing a second decoding for the data based on the supplementary number of bits includes producing a second result.

Statement 46. An embodiment of the inventive concept includes an article according to statement 44, wherein:

performing a first decoding for the data based on the base number of bits includes performing a first decoding responsive to the data and a first code based on the base number of bits; and performing a second decoding for the data based on the supplementary number of bits includes performing a second decoding responsive to the data and at least a second code.

Statement 47. An embodiment of the inventive concept includes an article according to statement 46, wherein performing a second decoding responsive to the data and at least a second code includes performing a second decoding responsive to the data, the first code, and the second code.

Statement 48. An embodiment of the inventive concept includes an article according to statement 46, wherein receiving data for a memory transaction includes receiving the first code and the at least second code.

Statement 49. An embodiment of the inventive concept includes an article according to statement 40, wherein the method is performed by one of a Dual In-Line Memory Module (DIMM) and a memory controller.

Statement 50. An embodiment of the inventive concept includes an article according to statement 49, wherein the DIMM includes a Non-Volatile Dual In-Line Memory Module (NVDIMM).

Statement 51. An embodiment of the inventive concept includes an article according to statement 40, wherein performing a second error management coding for the data based on the supplementary number of bits includes performing the second error management coding for the data based on the supplementary number of bits only if the supplementary number of bits is greater than zero.

Statement 52. An embodiment of the inventive concept includes an article according to statement 40, wherein:

performing a first error management coding for the data based on the base number of bits includes supporting error detection in the data; and performing a second error management coding for the data based on the supplementary number of bits includes supporting error correction in the data.

Statement 53. An embodiment of the inventive concept includes an article according to statement 40, wherein:

performing a first error management coding for the data based on the base number of bits includes supporting weak error detection in the data; and performing a second error management coding for the data based on the supplementary number of bits includes supporting strong error detection in the data.

Statement 54. An embodiment of the inventive concept includes an article according to statement 40, wherein:

performing a first error management coding for the data based on the base number of bits includes supporting weak error correction in the data; and performing a second error management coding for the data based on the supplementary number of bits includes supporting strong error correction in the data.

Statement 55. An embodiment of the inventive concept includes an article according to statement 40, wherein performing a second error management coding for the data based on the supplementary number of bits includes performing the second error management coding for the data based on the supplementary number of bits from at least the second error management coding and a third error management coding.

Statement 56. An embodiment of the inventive concept includes an article according to statement 55, wherein performing the second error management coding for the data based on the supplementary number of bits from at least the second error management coding and a third error management coding includes performing the third error management coding for the data based on a second supplementary number of bits.

Statement 57. An embodiment of the inventive concept includes an article according to statement 56, wherein performing the third error management coding for the data based on the second supplementary number of bits includes performing the third error management coding for the data based on the supplementary number of bits.

Consequently, in view of the wide variety of permutations to the embodiments described herein, this detailed description and accompanying material is intended to be illustrative only, and should not be taken as limiting the scope of the inventive concept. What is claimed as the inventive concept, therefore, is all such modifications as may come within the scope and spirit of the following claims and equivalents thereto.

What is claimed is:

1. A coding mechanism implemented in hardware, comprising:
   a first encoder to produce a first code solely from a data stored in a memory module, the first code including a base number of bits;
   a second encoder to produce a second code solely from the data stored in the memory module, the second code including a supplementary number of bits, wherein the first encoder and second encoder are different encoders on the same channel;
   storage for a mode register; and
   a switch responsive to the mode register to control whether or not the second encoder is used,
   wherein the first encoder is always used to produce the first code and the second encoder is optionally used to produce the second code, and
   wherein the second code together with the first code provides a stronger encoding than the first code alone.

2. The coding mechanism according to claim 1, wherein the mode register is operative to store a value indicating whether or not the switch is to use the second encoder, and the first encoder and second encoder each work on all of the data in the same channel.

3. The coding mechanism according to claim 2, wherein the mode register is operative to store the value indicating whether or not the switch is to use the second encoder responsive to whether or not the supplementary number of bits is greater than zero.

4. The coding mechanism according to claim 1, wherein the first encoder and the second encoder share a partial hardware implementation.

5. A coding mechanism implemented in hardware in a memory module, comprising:
   a first decoder to produce a first result solely from a data and a first code, the first code including a base number of bits;
   a second decoder to produce a second result solely from the data and at least a second code, the second code including a supplementary number of bits;
   storage for a mode register; and
   a switch responsive to the mode register to control whether or not the second decoder is used,
   wherein the first decoder is always used to produce the first result and the second decoder is optionally used to produce the second result, and
   wherein the second result together with the first result provides a stronger decoding than the first result alone.

6. The coding mechanism according to claim 5, wherein:
   the second decoder is operative to produce the second result responsive to the data, the first code, and the second code; and
   the first decoder and second decoder each work on all of the data.

7. The coding mechanism according to claim 5, wherein the mode register is operative to store a value indicating whether or not the switch is to use the second decoder.

8. The coding mechanism according to claim 7, wherein the mode register is operative to store the value indicating whether or not the switch is to use the second decoder responsive to whether or not the supplementary number of bits is greater than zero.

9. The coding mechanism according to claim 5, wherein the first decoder and the second decoder share a partial hardware implementation.

10. A method, comprising:
    receiving data for a memory transaction;
    determining a number of bits available for error management during the memory transaction, wherein the number of bits available for error management includes a base number of bits and a supplementary number of bits;
    performing a first error management coding for the data based on the base number of bits; and
    performing a second error management coding for the data based on the supplementary number of bits, wherein the first error management coding and second error management coding are performed on the same channel.

11. The method according to claim 10, wherein:
    performing a first error management coding for the data based on the base number of bits includes performing a first encoding for the data based on the base number of bits; and
    performing a second error management coding for the data based on the supplementary number of bits includes performing a second encoding for the data based on the supplementary number of bits.

12. The method according to claim 11, wherein:
    performing a first encoding for the data based on the base number of bits includes producing a first code; and
    performing a second encoding for the data based on the supplementary number of bits includes producing a second code.

13. The method according to claim 12, wherein the second code together with the first code provides a stronger error management coding than the first code alone.

14. The method according to claim 10, wherein:
    performing a first error management coding for the data based on the base number of bits includes performing a first decoding for the data based on the base number of bits; and
    performing a second error management coding for the data based on the supplementary number of bits includes performing a second decoding for the data based on the supplementary number of bits.

15. The method according to claim 14, wherein:
    performing a first decoding for the data based on the base number of bits includes performing a first decoding responsive to the data and a first code based on the base number of bits; and
    performing a second decoding for the data based on the supplementary number of bits includes performing a second decoding responsive to the data and at least a second code.

16. The method according to claim 15, wherein performing a second decoding responsive to the data and at least a second code includes performing a second decoding responsive to the data, the first code, and the second code.

17. The method according to claim 10, wherein performing a second error management coding for the data based on the supplementary number of bits includes performing the second error management coding for the data based on the supplementary number of bits only if the supplementary number of bits is greater than zero.

18. The method according to claim 10, wherein:
    performing a first error management coding for the data based on the base number of bits includes supporting error detection in the data; and
    performing a second error management coding for the data based on the supplementary number of bits includes supporting error correction in the data.

19. The method according to claim 10, wherein performing a second error management coding for the data based on the supplementary number of bits includes performing the second error management coding for the data based on the supplementary number of bits from at least the second error management coding and a third error management coding.

20. The method according to claim 19, wherein performing the second error management coding for the data based on the supplementary number of bits from at least the second error management coding and a third error management coding includes performing the third error management coding for the data based on a second supplementary number of bits.

21. The method of claim 10, wherein the first error management coding and the second error management coding each work on all of the data in the same channel.

22. The method of claim 10, wherein:
    receiving data for the memory transaction includes receiving the data for the memory transaction in a memory module;
    performing the first error management coding for the data based on the base number of bits includes performing the first error management coding solely from the data based on the base number of bits; and performing the second error management coding for the data based on the supplementary number of bits includes performing the second error management coding solely from the data based on the supplementary number of bits.

* * * * *